United States Patent
Hirata et al.

(10) Patent No.: US 6,856,855 B2
(45) Date of Patent: Feb. 15, 2005

(54) METHOD OF MANUFACTURING SHEET, DEVICE AND PROGRAM FOR CONTROLLING SHEET THICKNESS, AND SHEET

(75) Inventors: Hajime Hirata, Moriyama (JP); Masatsugu Uehara, Otsu (JP); Yasuhiro Nakai, Shiga (JP); Jiro Terao, Otsu (JP)

(73) Assignee: Toray Industries, Inc., Tokyo (JP)

( * ) Notice: Subject to any disclaimer, the term of this patent is extended or adjusted under 35 U.S.C. 154(b) by 438 days.

(21) Appl. No.: 10/130,253

(22) PCT Filed: Sep. 17, 2001

(86) PCT No.: PCT/JP01/08043

§ 371 (c)(1),
(2), (4) Date: May 21, 2002

(87) PCT Pub. No.: WO02/24434

PCT Pub. Date: Mar. 28, 2002

(65) Prior Publication Data

US 2003/0050717 A1 Mar. 13, 2003

(30) Foreign Application Priority Data

Sep. 21, 2000 (JP) .................................... 2000-286881

(51) Int. Cl.[7] .............................................. G06F 19/00
(52) U.S. Cl. .......................................... 700/196; 72/9.2
(58) Field of Search ............................... 700/196, 197,
700/204; 425/140, 141, 381, 466; 264/40.1,
40.5, 40.7, 176.1, 177.16; 72/9.2, 11.8,
12.7, 12.8, 16.9, 18.8

(56) References Cited

U.S. PATENT DOCUMENTS

| | | | | |
|---|---|---|---|---|
| 4,931,982 A | * | 6/1990 | Hayashida et al. | 700/129 |
| 5,059,265 A | | 10/1991 | Asakura | 156/64 |
| 5,166,885 A | * | 11/1992 | Thompson | 700/204 |
| 5,359,532 A | | 10/1994 | Akasaka | 364/476 |
| 5,397,514 A | | 3/1995 | Breil et al. | 264/40.1 |
| 5,493,885 A | * | 2/1996 | Nomura et al. | 72/9.1 |
| 5,761,066 A | * | 6/1998 | Lettau et al. | 700/155 |
| 5,860,304 A | * | 1/1999 | Anbe et al. | 72/9.1 |
| 5,927,117 A | * | 7/1999 | Zhang | 72/9.1 |
| 5,928,580 A | * | 7/1999 | Nitta et al. | 264/40.4 |
| 5,960,657 A | * | 10/1999 | Anbe et al. | 72/9.1 |
| 6,039,904 A | * | 3/2000 | Nitta et al. | 264/40.5 |
| 6,161,405 A | * | 12/2000 | Anbe et al. | 72/9.1 |
| 6,199,418 B1 | * | 3/2001 | Tezuka | 72/9.1 |
| 6,263,714 B1 | * | 7/2001 | Johnson et al. | 72/9.2 |
| 6,606,534 B1 | * | 8/2003 | Abiko et al. | 700/155 |

FOREIGN PATENT DOCUMENTS

| | | | |
|---|---|---|---|
| JP | 3-243324 | A | 10/1991 |
| JP | 5-35309 | A | 2/1993 |
| JP | 7-329417 | A | 12/1995 |
| JP | 2853881 | B2 | 11/1998 |
| JP | 2000-94497 | A | 4/2000 |

OTHER PUBLICATIONS

Featherstone, Andrew P., et al.; *Identification and Control of Sheet and Film Processes* (*Advances in Industrial Control*); pp. 15–27, 129–144; 2000.

* cited by examiner

Primary Examiner—Maria N. Von Buhr
(74) Attorney, Agent, or Firm—Kubovcik & Kubovcik

(57) ABSTRACT

A method of controlling the thickness of sheets manufactured by the extrusion of a material from a die having a plurality of thickness adjusting means by repeating, at specified timings, the following steps of 1) measuring the distribution of thickness of the sheets in lateral direction, 2) evaluating a predicted future variation in sheet thickness by using a specified evaluation function and based on a process model representing a relation between the amount of operation and the sheet thickness and sheet thickness measured values and leading an operating amount time series to minimize the evaluation function, and 3) outputting at least the initial amount of operation of the led operating amount time series to the thickness adjusting means.

33 Claims, 18 Drawing Sheets

METHOD OF MANUFACTURING SHEET, DEVICE AND PROGRAM FOR CONTROLLING SHEET THICKNESS, AND SHEET

TECHNICAL FIELD

The present invention relates to a method of manufacturing a sheet such as a film, a device for controlling thickness of a sheet, a program for controlling thickness of a sheet, and a sheet.

BACKGROUND ART

A conventional sheet production process, in which the thickness of a sheet such as a macromolecular film is controlled in the transverse direction to have a desired profile such as a uniform thickness, is described below in referent to FIGS. 2 and 3.

A macromolecular polymer as a raw material is extruded from an extruder 3 while being widened in the transverse direction perpendicular to the paper surface of FIG. 2 using a die 4, to form a sheet 1, and the sheet 1 is stretched by a stretching machine 2 in the machine direction (sheet running direction) and the transverse direction (sheet transverse direction), and sheet 1 is wound by a winder 6. The die 4 has plural thickness adjusting means 10 provided at equal intervals in the transverse direction. The thickness adjusting means, for example, heaters or gap adjusters, have function of changing the amounts of the discharged polymer. A thickness gauge 8 measures the thickness distribution of the sheet 1 in the transverse direction of the sheet, and a control means 9 manipulates plural thickness adjusting means 10 based on the measured values at the positions corresponding to the respective thickness adjusting means.

Widely used control means is composed of control loops independently provided for the respective thickness adjusting means, and for each of the control loops, this control means carries out known PID control, in which the result of the proportional-plus-integral-plus-derivative computation of the deviation between a measured thickness value and a target value is delivered as a manipulated variable to each of the thickness adjusting means. Japanese Patent No. 3,021,135 discloses a thickness controller using modern control theory as the thickness control means.

The above-mentioned conventional control system, in which independent control loops are provided for the respective thickness adjusting means, cannot perform sufficiently satisfactory control yet. One of the reasons is that if one of the thickness adjusting means is manipulated, an interference phenomenon occurs in which the sheet thickness vary also at the positions corresponding to the adjacent thickness adjusting means. For this reason, the control loops corresponding to the respective thickness adjusting means interfere with each other, and even if the manipulated variables are computed based on the deviations between the thickness values and the target values of the corresponding positions, for control, it can happen that thickness distribution dose not approach the target values affected by the adjacent adjusting means or that the speed of approaching the target values is very slow.

As another reason, there is a time lag after one of the thickness adjusting means is manipulated till the result is reflected in the thickness result at the corresponding position, that is, a delay time so-called in control occurs. So, if the gain of PID control is made larger, too much manipulation is carried out before the result of the manipulated variable delivered to the thickness adjusting means is reflected in the thickness result at the corresponding position, and the control becomes unstable. Therefore, the gain of control must be kept small to stabilize the control, and the control system is poor in quick responsiveness.

Meanwhile, in the case where, for example, a polyester film is wound as a roll, it can happen that the wound roll is wrinkled or streaked or disfigured at end faces, to extremely lower the value of the produced roll, or even to completely loose the commercial value.

To avoid this problem, it is proposed to improve the surface properties of the film, or to decrease the thickness irregularity, or to disperse the thickness irregularity in the transverse direction of the film by oscillation.

However, the above-mentioned prior art have such a problem that the properties of the film have to be changed, or that the productivity must be lowered, or that the improvement is insufficient. Especially when it is attempted to obtain a thinner film, these problems become more significant.

Furthermore, in recent years, the requirement for better roll form becomes more intensive, and oscillation cannot solve the problem any more.

The invention has been completed to solve these problems. Objects of the invention are to provide a sheet thickness controller that can uniformly and stably control the thickness of a sheet in the transverse direction over the entire width, and to provide a process for producing such a sheet.

Another object of the invention is to provide a roll which form has less wrinkles and streaks, with the productivity sustained at a high level without changing the properties of the sheet.

DISCLOSURE OF THE INVENTION

The invention provides a method of manufacturing sheet, in which a raw material is extruded and molded into a sheet using a die with plural thickness adjusting means and the thickness of said sheet is controlled by the manipulated variables applied to said thickness adjusting means, characterized by repeating, at predetermined intervals, a step of measuring the thickness distribution of the sheet in the transverse direction, a step of deriving manipulated variable time series in which a predetermined evaluation function for evaluating the future sheet thickness changes predicted based on said measured values and on a process model expressing the relation between said manipulated variables and sheet thickness values becomes a minimum value, and a step of delivering at least the first manipulated variables of the derived manipulated variable time series to said thickness adjusting means.

The invention provides also a device for controlling sheet thickness, in which manipulated variables are applied to sheet thickness adjusting means at corresponding positions based on the measured sheet thickness values at respective positions of a sheet in the transverse direction measured by a thickness measuring means for measuring the thickness distribution of the sheet in the transverse direction; comprising a manipulated variable time series deriving means for deriving manipulated variable time series in which a predetermined evaluation function for evaluating the future sheet thickness changes predicted based on said measured values and on a process model expressing the relation between said manipulated variables and sheet thickness values becomes a minimum value and a manipulated variable delivering means for delivering at least the first manipulated variables of the derived manipulated variable time series to said thickness adjusting means.

Moreover, the invention provides a program, for letting a computer perform the action of repeating, at predetermined intervals, a step of entering the measured thickness values at the respective positions of a sheet in the transverse direction, a step of computing the differences between the target thickness values and the measured thickness values at the respective positions, and a step of computing the manipulated variables to be applied to thickness adjusting means based on the differences at the respective positions, characterized in that the step of computing manipulated variables includes a step of deriving manipulated variable time series in which a predetermined evaluation function for evaluating the future sheet thickness changes predicted based on said measured values and on a process model expressing the relation between said manipulated variables and sheet thickness values becomes a minimum value and a step of delivering at least the first manipulated variables of the derived manipulated variable time series to said thickness adjusting means.

Still furthermore, the invention provides a sheet, obtained by extruding and molding a raw material using a die with plural thickness adjusting means, characterized in that the power spectrum of the thickness profile of the sheet in the transverse direction expressed by the following formula $$P = F(\omega)(F(\omega))^*$$
$$F(\omega) = \int_{-\infty}^{\infty} f(x)e^{-j\omega x} dx$$

(where f(x) is the thickness profile of the sheet in the transverse direction (in $\mu$m), $F(\omega)$ is the Fourier transform of f(x), x is a position in the transverse direction of the sheet (in m), $\omega$ is a wave number (in m$^{-1}$), and $F(\omega)^*$ is the conjugate complex number of $F(\omega)$; and j is an imaginary number, and $j^2=-1$) and the average sheet thickness T ($\mu$m) satisfy the following relation: The mean value X1 of the powers of smaller than a predetermined wave number a is $0.2 \times T^2$ or less and is smaller than the mean value X2 of the powers of wave number a and larger.

MEANINGS OF SYMBOLS

Figure 1:
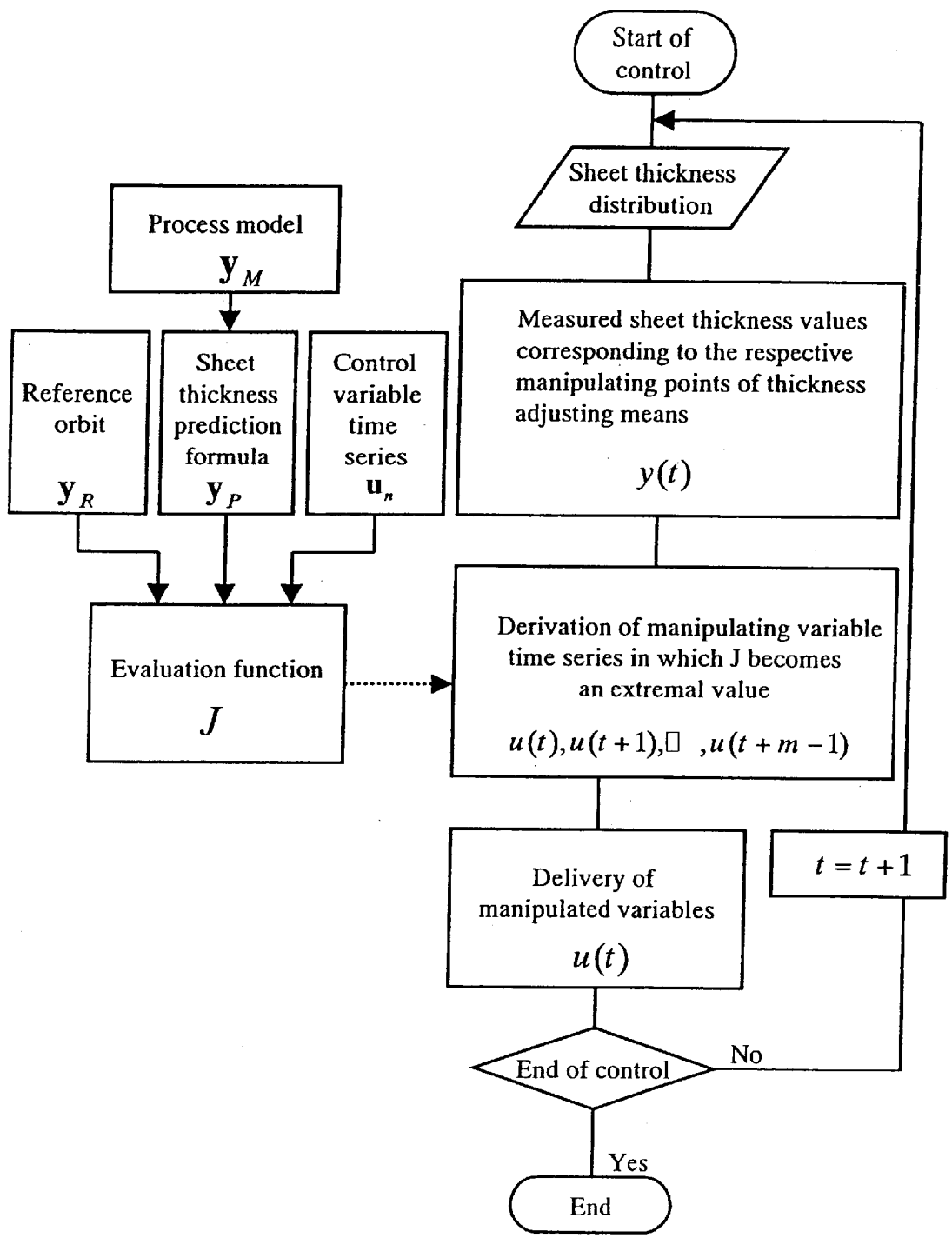
FIG. 1 is a sheet thickness control flowchart in an embodiment of the invention.

1: Sheet
2: Stretching machine
3: Extruder
4: Die
5: Cooling roll
6: Winder
7: Carrier roll 8: Thickness meter
9: Control means
10: Thickness adjusting means
11: Slit
21: Manipulated variable computing means
22: Manipulated variable delivering means
23: Manipulated variables
24: Measured thickness values
25: Deviation data
26: Sheet production process
27: Manipulated variables to be corrected
28: Manipulated variable computing means
211: Basic heat quantity computing means
212: Control heat quantity computing means
213: Control differential value computing means
214: Heat quantity computing means
30: Change of sheet thickness with the lapse of time in the case where a heat bolt is pulled
31: Change of sheet thickness with the lapse of time in the case where a heat bolt is pushed
32: Sheet thickness variation after lapse of certain time in the case where a heat bolt is pulled
33: Sheet thickness variation after lapse of certain time in the case where a heat bolt is pushed
34: Certain period of time after applying a heat quantity
35: Change of sheet thickness with the lapse of time in the case where the heat quantity is large
36: Change of sheet thickness with the lapse of time in the case where the heat quantity is small
37: Change of sheet thickness with the lapse of time in the case where the time constant is smaller than that of 36
40: Second desired value correcting means
41: Integrating means
42: First desired values
43: Second desired values
44: Deviations
50: Produced roll
51: Paper tube
52: Winding mound
60: Manipulated variable to be corrected
71: Change of film thickness with the lapse of time in the case where heat bolts are pushed
72: Functional approximation curve of 71
73: Change of film thickness with the lapse of time in the case where heat bolts are pulled
74: Functional approximating curve of 73
75: 10% variation of film thickness
76: 90% variation of film thickness
81: Outer diameter profile of a produced roll in the case where the film is produced by a conventional process
82: Outer diameter profile of a produced roll in the case where the film is produced by the process of the invention
90: Power spectrum

THE BEST MODES FOR CARRYING OUT THE INVENTION

The invention is described below in reference to drawings.

An example of the sheet production process, in which the thickness of a sheet such as a macromolecular film is controlled in the transverse direction of the sheet to have a desired profile, such as a uniform thickness, is described below in reference to FIGS. 2, 3 and 4.

Figure 2:
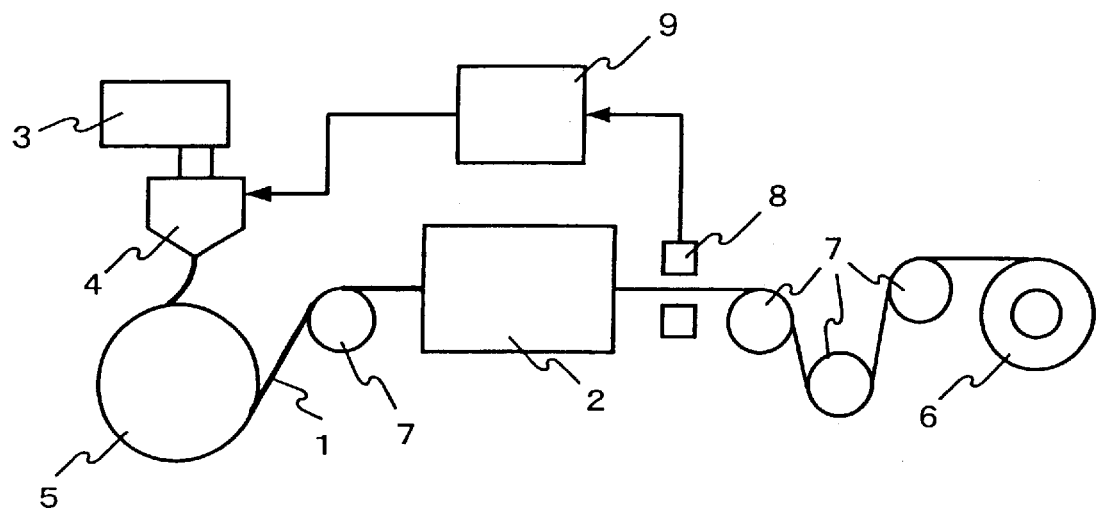
FIG. 2 is a schematic view of system of sheet production equipment in an embodiment of the invention.
Figure 3:
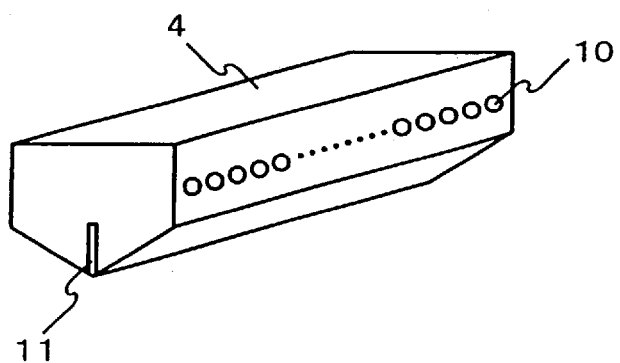
FIG. 3 is an enlarged perspective view of a key portion of the die shown in FIG. 2.

FIG. 2 is a schematic view of general sheet production equipment, and FIG. 3 is an enlarged perspective view of the die shown in FIG. 2.

Figure 4:
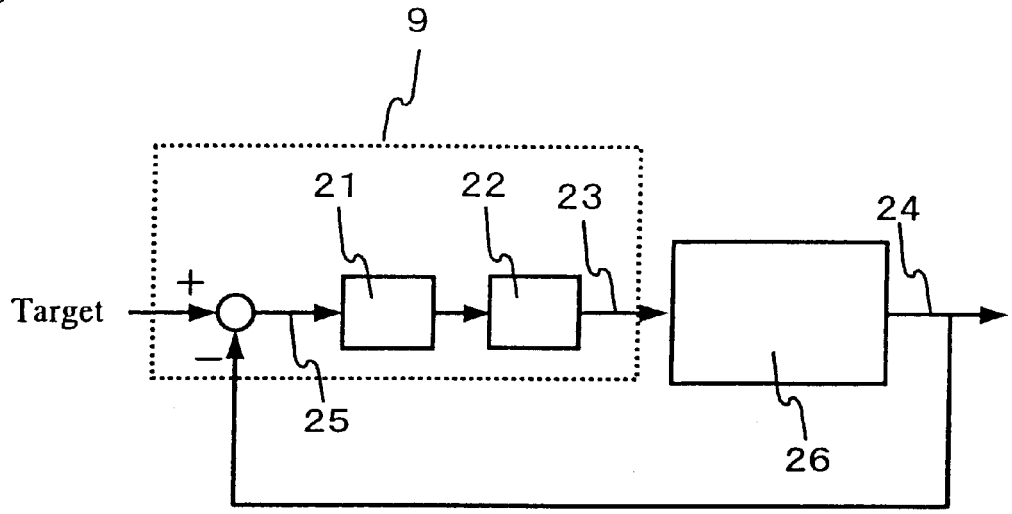
FIG. 4 is a diagram showing the basic constitution of thickness control in an embodiment of the invention.

FIG. 4 is a block diagram showing a method of controlling the sheet thickness.

A polymer is extruded from an extruder 3 and widened in the transverse direction perpendicular to the paper surface of FIG. 2 by a die 4, to form a sheet, and the sheet is stretched in the machine direction and in the transverse direction by a stretching machine 2, and wound by a winder 6.

The die 4 has plural thickness adjusting means 10 disposed at equal intervals in the transverse direction. The thickness adjusting means 10 can be either of bolt method or heater method; according to the bolt method, bolts as thickness adjusting means are disposed to change the gap 11 of the die 4 mechanically, thermally or electrically for changing the amount of the discharged polymer, and according to the heater method, heaters as thickness adjusting means are disposed and changes the generated heat for changing the viscosity, hence flow velocity of the polymer at the portion, for changing the discharged amount. Furthermore, the sheet production equipment is provided with a thickness gauge 8 for measuring the thickness distribution of the sheet in the transverse direction and a control means 9 for controlling the thickness adjusting means 10 based on the thickness distribution.

The thickness gauge 8 measures the thickness values of the sheet as a thickness distribution in the transverse direction of the sheet. The thickness meter 8 can be any optional thickness measuring instrument that uses the absorptivity of $\beta$ rays, infrared rays, ultraviolet rays, X rays or the like, or the light interference phenomenon, etc.

The control means 9 receives the measured sheet thickness distribution values in the transverse direction measured by the thickness gauge 8, and obtains the measured sheet thickness values corresponding to the respective manipulating points of the thickness adjusting means 10 from them, and derives the manipulated variables for the respective manipulating points by computing the control actions based on the measured sheet thickness values corresponding to the respective manipulating points as described later by using a manipulated variable computing means 21, and delivers the manipulated variables to the respective manipulating points at predetermined intervals by using a manipulated variable delivering means 22.

The manipulated variables for the respective manipulating points are applied to the thickness adjusting means 10 through a power unit not illustrated. In the case of the heat bolt method for thermally expanding and contracting bolts, the power unit supplies electric powers to the heaters attached to the bolts, to heat the bolts which are expanded or contracted depending on the powers, for adjusting the gap 11. Also in any other method, electric powers are supplied to actuate the thickness adjusting means 10, and the actuated thickness adjusting means control the sheet to have a target profile.

The action of the control means 9 is described below in detail.

FIG. 1 is a flowchart of the control means 9. At every time point t (t=0, 1, 2, . . . ) after start of control, the sheet thickness distribution measured by the thickness meter 8 is applied to obtain the measured sheet thickness values corresponding to the respective manipulating points of the thickness adjusting means 10, and in the manipulated variable time series deriving step described later, manipulated variable time series are derived. Then, in a manipulated variable delivering step, the manipulated variables to be actually delivered to the thickness adjusting means 10 are decided from the derived manipulated variable time series, and are delivered. This process is repeated till the control is completed.

The following description is made using discrete times. It is preferable that each control time interval is the time taken for the thickness gauge 8 to measure the thickness distribution of the sheet 1 in the transverse direction of the sheet, or a multiple of the time. Ordinarily, the intervals are tens of seconds to several minutes. The control timings are not necessarily required to be fixed cycles, and can be changed as required, depending on the stability condition of the process, etc. For example, in the beginning of production, the control can be carried out at short cycles, and during stable production, the control can be carried out at long cycles.

In the case where a process model is used, when a certain manipulated variable time series is delivered, how the sheet thickness will change can be predicted. In the manipulated variable time series deriving step, what manipulated variables should be delivered for control to optimize the predicted sheet thickness, that is, to keep a predetermined evaluation function at a minimum value.

The computation in the manipulated variable time series deriving step is to obtain manipulated variable time series from a predetermined manipulated variable time series deriving formula using the measured sheet thickness values and the manipulated variables delivered till then. The concept for arriving at this manipulated variable time deriving formula is described below.

At first, considered is a process model expressing how the sheet thickness changes when manipulated variables are applied to thickness adjusting means 10. This process model expresses, as a numerical formula, the lag in the action of the thickness adjusting means after the delivery of the manipulated variables, the delay time taken for the sheet 1 to be carried from the die 4 to the position of the thickness meter 8, and the delay time taken for the thickness meter 8 to measure the thickness profile in the transverse direction, and also the interference that when one thickness adjusting means is manipulated, the sheet changes in thickness at the positions corresponding to the adjacent thickness adjusting means. As far as the above conditions are satisfied, any process model can be used. However, if an individual model is used for each thickness adjusting means, enormous time and labor are needed, and the time series deriving formula becomes too complicated. So, it is preferable that the process model is expressed using a product obtained by multiplying a scalar transfer function expressing the relation between the manipulated variables of thickness adjusting means and the film thickness values at the corresponding positions, by a constant matrix expressing the interferences between individual thickness adjusting means in which at least the diagonal component is not zero. With this, the manipulated variable time series computation can be simplified. Such a process model can be expressed by the following formula using, for example, a discrete time transfer function.

Formula 1:

$$y_M(z) = \frac{b_q z^{-q} + a_{q-1} z^{-(q-1)} + \cdots + b_1 z^{-1}}{a_p z^{-p} + a_{p-1} z^{-(p-1)} + \cdots + 1} wu(z)$$

In the above formula, $y_M$ and $u$ respectively are the sheet thickness values and manipulated variables at the measuring positions corresponding to respective thickness adjusting means, being vectors having elements as many as the number N of thickness adjusting means 10; p and q are the degrees of the discrete time transfer function; and a and b are the respective coefficients; and p, q, a and b are decided considering the delay time and lag in the actual sheet production process.

W is an N×N matrix expressing the interferences between the individual thickness adjusting means, and expressed by the following formula.

Formula 2:

$$W = \begin{bmatrix} 1 & \alpha_1 & \alpha_2 & 0 & \cdots & & \cdots & & 0 \\ \alpha_1 & 1 & \alpha_1 & \alpha_2 & 0 & & & & 0 \\ \alpha_2 & \alpha_1 & 1 & \alpha_1 & \alpha_2 & 0 & & & 0 \\ 0 & \alpha_2 & \alpha_1 & 1 & \alpha_1 & \alpha_2 & 0 & & \\ 0 & 0 & \alpha_2 & \alpha_1 & 1 & \alpha_1 & \alpha_2 & \ddots & \\ 0 & & \ddots & \ddots & \ddots & 1 & \ddots & & \\ \vdots & & & \ddots & & & \ddots & \ddots & \\ & & & & \ddots & \ddots & \ddots & \ddots & \alpha_2 \\ & & & & & \ddots & \alpha_2 & \alpha_1 & 1 & \alpha_1 \\ 0 & & \cdots & & \cdots & & 0 & \alpha_2 & \alpha_1 & 1 \end{bmatrix}$$

In the above formula, $\alpha_1$ ($\geq 0$) is the rate at which the sheet thickness values at the positions corresponding to one of the first adjacent thickness measuring means change, and $\alpha_2$ ($\geq 0$) is the rate at which the sheet thickness values at the positions corresponding to one of the second adjacent thickness adjusting means change. They are called interference rates in this specification. When a certain thickness adjusting means is manipulated, the sheet thickness at the sheet thickness measuring position corresponding to the thickness adjusting means changes, and the interference rates are the values expressing how much the sheet thickness changes at the measuring positions corresponding to the adjacent thickness adjusting means in this case. That is, when a certain thickness adjusting means is manipulated, the sheet thickness changes not only at the manipulating position but also in a certain peripheral region due to the rigidity of the die and the influence in the stretching process.

In the above formula, the rate at which the sheet thickness values at the positions corresponding to both the third and farther adjacent thickness adjusting means change is assumed to be 0, but $\alpha_3$ ($\geq 0$) and more may also be considered. However, it is preferable to assume that $\alpha_3$ ($\geq 0$) and rates at farther thickness adjusting means are 0, since the computation is simpler with little effect on the computation result. Furthermore, as described later, the values of $\alpha_1$ and $\alpha_2$ of respective rows can also be different from row to row.

From the process model, if $$B_i = b_i W,$$

the sheet thickness $y_M(t)$ at time point t can be expressed by Formula 7:

$$y_M(t) = a_1 y_M(t-1) + a_2 y_M(t-2) + \cdots + a_p y_M(t-p) +$$
$$B_1 u(t-1) + B_2 u(t-2) + \cdots + B_q u(t-q)$$

Furthermore, if $$\Delta y_M(t) = y_M(t) - y_M(t-1), \text{ and}$$

$$\Delta u(t) = u(t) - u(t-1),$$

the sheet thickness values $y_M(t+1)$ and $y_M(t+2)$ at future time points t+1 and t+2 can be expressed respectively by Formula 8:

$$y_M(t+1) = y_M(t) + a_1 \Delta y_M(t) + a_2 \Delta y_M(t-1) + \cdots + a_p \Delta y_M(t+1-p) + B_1 \Delta u(t) + B_2 \Delta u(t-1) + \cdots + B_q \Delta u(t+1-q)$$

$$y_M(t+2) = y_M(t) + ((1+a_1)a_1 + a_2)\Delta y_M(t) + \cdots + (1+a_1)a_p \Delta y_M(t+1-p) + B_1 \Delta u(t+1) + ((1+a_1)B_1 + B_2)\Delta u(t) + \cdots + (1+a_1)B_q \Delta u(t+1-q)$$

If this is applied recursively, the sheet thickness values $y_M(t+j)$ at time point t+j (j>1) can expressed as follows, using sheet thickness values $y_M(t-1), \ldots, y_M(t-p)$, and manipulated variables $u(t-q), \ldots, u(t+j-1)$.

Formula 9:

$$y_M(t+j) = y_M(t) + h_{j,1}\Delta y_M(t) + h_{j,2}\Delta y_M(t-1) + \cdots + h_{j,p}\Delta y_M(t+1-p) + g_{j,1}\Delta u(t+j-1) + g_{j,2}\Delta u(t+j-2) + \cdots + g_{j,q}\Delta u(t+1-q)$$

In the above formula, the sheet thickness values $y_M(t-1), \ldots, y_M(t-p)$ and manipulated variables $u(t-1), \ldots, (t-p)$ are known at time point t, and g and h can be obtained from the coefficients a and b of the transfer function shown in formula 1 and are known beforehand from the above process model. So, it can be said that the future sheet thickness values $y_M(t+j)$ can be calculated if the manipulated variable time series $u(t), \ldots, u(t+j-1)$ delivered after the time point t are known.

The above sheet thickness values are obtained from a process model. However, the process model does not perfectly agree with the actual process, and the actual sheet thickness values become different because of various disturbances, etc. Therefore, even if the sheet thickness values in the far future are obtained to derive the evaluation function for optical control, the manipulated variables are decided using uncertain information with large errors after all unpreferably. So, considered are finite periods of time such as time m (an integer larger than 0) taken to change the manipulated variables and the time P (an integer larger than 0) taken to obtain the sheet thickness values. That is, in the case where the manipulated variables are changed from time point t to t+m−1 and kept constant thereafter, the sheet thickness values of the period from time point (t+L) to (t+L+P−1) (L is an integer) can be expressed by Formula 10:

$$\begin{bmatrix} y_M(t+L) \\ y_M(t+L+1) \\ \vdots \\ \vdots \\ y_M(t+L+P-1) \end{bmatrix} = \begin{bmatrix} y_M(t) \\ y_M(t) \\ \vdots \\ \vdots \\ y_M(t) \end{bmatrix} +$$

$$\begin{bmatrix} g_{L,L} & g_{L,L-1} & \cdots & g_{L,1} & \cdots & 0 \\ g_{L+1,L+1} & g_{L+1,L} & \cdots & g_{L+1,1} & \cdots & 0 \\ \vdots & \vdots & & \vdots & & \vdots \\ \vdots & \vdots & & \vdots & & \vdots \\ \vdots & \vdots & & \vdots & & \vdots \end{bmatrix} \begin{bmatrix} \Delta u(t) \\ \Delta u(t+1) \\ \vdots \\ \vdots \\ \Delta u(t+m-1) \end{bmatrix} +$$

$$\begin{bmatrix} g_{L,L+1} & g_{L,L+2} & \cdots \\ g_{L+1,L+2} & g_{L+1,L+3} & \cdots \\ g_{L+2,L+3} & \vdots & \\ \vdots & & \\ g_{L+p-1,L+p} & & \end{bmatrix} \begin{bmatrix} \Delta u(t-1) \\ \Delta u(t-2) \\ \vdots \\ \vdots \\ \Delta u(t-q+1) \end{bmatrix} +$$

$$\begin{bmatrix} h_{L,1} & h_{L,2} & \cdots \\ h_{L+1,1} & h_{L+1,2} & \cdots \\ \vdots & \vdots & \\ h_{L+p-1,1} & \cdots & \end{bmatrix} \begin{bmatrix} \Delta y(t) \\ \Delta y(t-1) \\ \vdots \\ \vdots \\ \Delta y(t-p+1) \end{bmatrix}$$

The above can be expressed as a vector matrix as follows.

Formula 11:

$$y_M = y_{M0} + G_F \Delta u_n + G_0 \Delta u_0 + Q_0 \Delta y_M$$

The above is the future sheet thickness values derived from the process model. On the other hand, at time point t, the thickness gauge 8 measures the actual sheet thickness distribution, and from it, the actual sheet thickness values y (t) corresponding to the respective manipulating points of the thickness adjusting means 10 can be known. So, if they are used to predict the sheet thickness values at time point t+J, the prediction formula $y_P(t+j)$ is Formula 12:

$$y_P(t+j) = y_M(t+j) + y(t) - y_M(t)$$

As described above, the formula for predicting the sheet thickness values in the period from time point (t+L) to (t+L+P−1) is, Formula 13:

$$y_P = y + G_F \Delta U_n + G_0 \Delta U_0 + Q_0 \Delta y_M$$

In the above formula, y is a vector as an array of M vectors y (t) respectively having elements as many as N. That is, $y_P$ is time series expressing the future sheet thickness changes predicted from the above formula.

Now, considered is the evaluation function for evaluating to ensure that the thickness prediction formula is optimized.

At first, from the sheet thickness profile y(t) measured as of time point t, set is a reference orbit $Y_R(t+j)$ (j=1, 2, ...) arriving at the desired thickness profile r (vector with N elements) at time point t+j.

The reference orbit can be set as required according to a conventional method. It can be expressed by, for example, Formula 14:

$$y_R(t+j) = \beta^{j-L+1} y(t) + (1 - \beta^{j-L+1}) r$$

If β is made closer to 0, an orbit for approaching the designed profile r faster is obtained. It is desirable that the deviation (quadratic form of it) between the sheet thickness prediction formula and this reference orbit is smaller.

On the other hand, for the manipulated variables, it is desirable that the changes Δu of manipulated variables are smaller. Considering the above points, as the evaluation function J, Formula 15:

$$J = (y_R - y_P)^T \Lambda (y_R - y_P) + \Delta U_n^T \Psi \Delta u_n$$

is used, and the manipulated variable time series in which this function become a minimum value are derived. In the above formula, Formula 16:

$$y_R = \begin{bmatrix} y_R(t+L) \\ y_R(t+L+1) \\ \vdots \\ \vdots \\ y_R(t+L+P-1) \end{bmatrix}, \Lambda = \begin{bmatrix} \lambda_1^2 & & 0 \\ & \ddots & \\ 0 & & \lambda^2 \end{bmatrix}, \Psi = \begin{bmatrix} \psi_1^2 & & 0 \\ & \ddots & \\ 0 & & \psi_P^2 \end{bmatrix}$$

In the above formula, the first term relates to the deviations between the reference orbit and the predictive thickness till the target thickness values are reached, and the second term relates to manipulated variables. Λ and Ψ decide the respective degrees of contribution.

In general, in the beginning of film production, since the deviations from the desired thickness values are large, large manipulated variables should be applied to quickly make the deviations smaller, and during stable film production, large manipulated variables should not be applied since the deviations are small. So, it is preferable to prepare evaluation functions different in said relation between Λ and Ψ; to ensure that the contribution of Ψ relating to the manipulated variables is kept small in the beginning of film formation and that the contribution of Ψ is kept large during stable film formation.

In this case, the necessary condition to ensure that the evaluation function J takes a minimum value is Formula 17:

$$\frac{\partial J}{\partial \Delta u_n} = 0$$

and the Δu_n satisfying the above is
Formula 18:

$$\Delta u_n = (G_F^T \Lambda G_F + \Psi)^{-1} G_F^T \Lambda (y_R - y - G_0 \Delta u_0 - Q_0 \Delta y_M)$$

and this is the manipulated variable time series deriving formula.

That is, in the manipulated variable time series deriving step, the measured sheet thickness values y(t) obtained in the previous step are substituted into the y and $y_R$ of the above formula, and $\Delta u_0$ and $\Delta y_M$ are updated based on the information of till time point t−1, to derive the variations $\Delta u_n$ of the manipulated variable time series, for deciding u(t), ..., u(t+m−1) from them.

Then in the manipulated variable delivering step, from the manipulated variable time series decided above, u(t) only is actually delivered to the thickness adjusting means 10.

The manipulated variable time series deriving step and the manipulated variable delivering step are repeated at time points t, t+1, t+2, .... That is, at time point t+1, decided are u(t+1), ..., u(t+m) using the manipulated variable time series deriving formula, with the newly measured y(t+1) and the previously delivered u(t) as known values, and among them, u(t+1) is delivered to the thickness adjusting means 10.

The manipulated variable time series deriving step can be repeated every time point as described above. Furthermore, it is also possible to derive manipulated variable time series, for example, at time points t, t+s, t+2s at s cycles, where s is an integer in a range of 2≦s≦m, and to deliver the u(t), ..., u(t+s−1) derived at time point t in the period from t to t+s−1.

The above-mentioned control action computation allows the sheet thickness values to be controlled to have a target thickness profile quickly and high accurately. That is, a process model, which formulates the interference phenomenon that if one thickness adjusting means is manipulated, the sheet thickness values at the portions corresponding to the adjacent adjusting means are changed, and which also formulates the delay time and lag after manipulating one thickness adjusting means till the result appears in the measured thickness value at the corresponding position, is used to decide a thickness prediction formula, and the manipulated variable time series for optimizing the formula are decided and added. So, the sheet thickness values converge on the desired values very quickly and very high accurately.

Furthermore, even if actually measured thickness values y become different from the prediction formula $y_P$ as in the case where the process model contains an error or where any other disturbance occurs, quasi-optimum manipulated values can be decided through control without causing the deviations due to the error or disturbance of the model to be accumulated, if the decision of the prediction formula and the decision of optimum manipulated variable time series are frequently carried out using newly measured thickness values y. So, the sheet thickness values can be controlled to approach the desired values quickly and very high accurately.

A parametric model is described above as the process model. However, for example, the following models can also be used: an impulse response model that describes how the sheet thickness values change at time points t=1, 2, 3, ..., when impulse-wise outputs are given as manipulated variables to the thickness adjusting means 10 at time point t=0; a step response model that describes how the sheet thickness values change at time points t=1, 2, 3, ... when step-wise outputs are given as manipulated variables to the thickness adjusting means 10 at time point t=0; and a state space model that uses state variables to describe the relation between manipulated variables and state variables and the relation between state variables and sheet thickness values.

Figure 6:
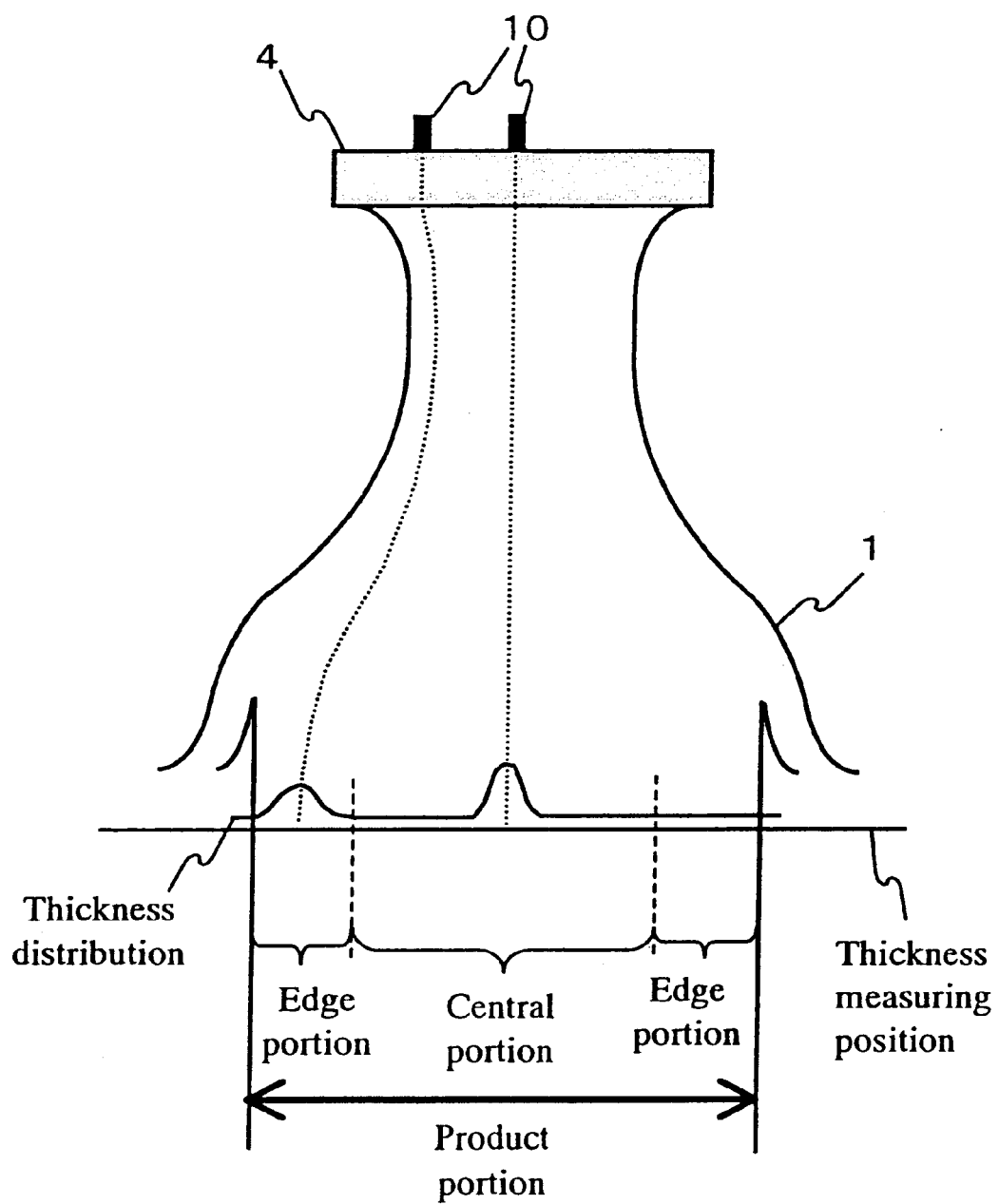
FIG. 6 is a drawing showing the relation between thickness adjusting means and sheet thickness measurement in an embodiment of the invention.

In the above-mentioned sheet production process, in the case where a sheet is stretched in the transverse direction, the stretching condition can be regarded to be almost constant in the transverse direction in the central portion of the sheet, but as shown in FIG. 6 edge portions of the produced sheet are likely to be affected by the neck-in phenomenon that the sheet width becomes more narrow immediately after the raw material has been discharged from the die 4 than the width achieved while the raw material is discharged, or by the polymer flow at the die edge portions. So, the sheet is stretched at the edge portions under conditions different from those in the central portion. Since the edge portions are greatly affected by process conditions than the central portion, in the case where the sheet thickness control means is designed, it is preferable that the process model is set differently in the portions corresponding to the edge portions and the central portion in the transverse direction of the sheet as shown in FIG. 1. It is more preferable to set the parameters participating in the decision of the control means, for example, the process gain and interference rate differently for the respective portions.

A process gain refers to the rate of the controlled variable change to the manipulated variable change. That is, it refers to a value how much the thickness of the sheet changes when a manipulated variable applied to the sheet thickness adjusting means is changed by a unit quantity.

The borders between the central portion and the edge portions can also be decided in reference to the film forming conditions such as the stretching ratio in the transverse direction of the sheet and the sheet thickness and the distribution of sheet thickness values dispersed in the transverse direction of the sheet. It is also preferable to change the borders depending on the state of film production, for example, to set the width of the central portion at 70 to 80% and the width of the edge portions at the balance in the state of stable film production and to set the width at 60% or less when the sheet thickness in the transverse direction is not stable as in the beginning of film production.

As for the process gains, it is preferable to keep the process gains in the edge portions smaller than the process gains in the central portion, since it can happen that in the edge portions of the sheet, the sheet thickness does not change so much as in the central portion as shown in the thickness distribution of FIG. 6 due to the structural limit of the die and the buffer effect of the polymer at the die edge portions, even if the manipulated variables for the sheet thickness adjusting means are changed by a certain quantity. That is, since the die may be fixed at the outermost edge portions or since the several thickness adjusting means in the outermost edge portions may be fixed, it can happen that even if manipulated variables are applied to the sheet thickness adjusting means to keep the sheet thickness thinner in the edge portions, the actually actuated strokes of the thickness adjusting means become small, and furthermore, that since the polymer flow at the die edge portions flow in, the actual sheet thickness in the edge portions does not become as thin as that in the central portion. Similarly, even if manipulated variables are applied to the sheet thickness adjusting means to make the sheet thickness thicker in the edge portions, it can happen that the actually actuated strokes of the thickness adjusting means become small, or that since the polymer flows partially into the die edge portions, the actual sheet thickness is in the edge portions does not become as thick as that in the central portion.

As for the interference rates, it is preferable that the interference rates at the positions corresponding to the adjacent adjusting means in the edge portions are larger than in the central portion. The reasons are the same as those described for the process gains. Since the die may be fixed at the outermost edge portions or since several thickness adjusting means in the outermost edge portions may be fixed, it can happen that when manipulated variables are applied to the sheet thickness adjusting means in the edge portions, the differences from the actually actuated strokes at the positions of the adjacent thickness adjusting means become small, and that since the polymer flow at the die edge portions causes buffer action, the differences between the actual sheet thickness values in the manipulated positions and those in the positions corresponding to the adjacent thickness adjusting means become small.

Furthermore, for the above reasons, instead of setting the interference rates in the edge portions symmetrically about a manipulated position, the interference rates on the edge portion side can be kept large while those on the central portion side are kept small.

Moreover, both the process gain and interference rate can be set respectively differently for the right and left edge sides in the sheet running direction.

To decide the process gains and interference rates in the central portion and the edge portions used for expressing the process model, it is preferable to measure the step responses of the thickness adjusting means. That is, if step-wise changing manipulated variables are applied to thickness adjusting means representing the edge portions and thickness adjusting means representing the central portion, the process gains and interference rates in the edge portions and the central portion can be measured from the changes in sheet thickness caused in this case.

A method of designing the control means 9 based on the process gains and interference rates decided according to the above methods is described below.

Figure 5:
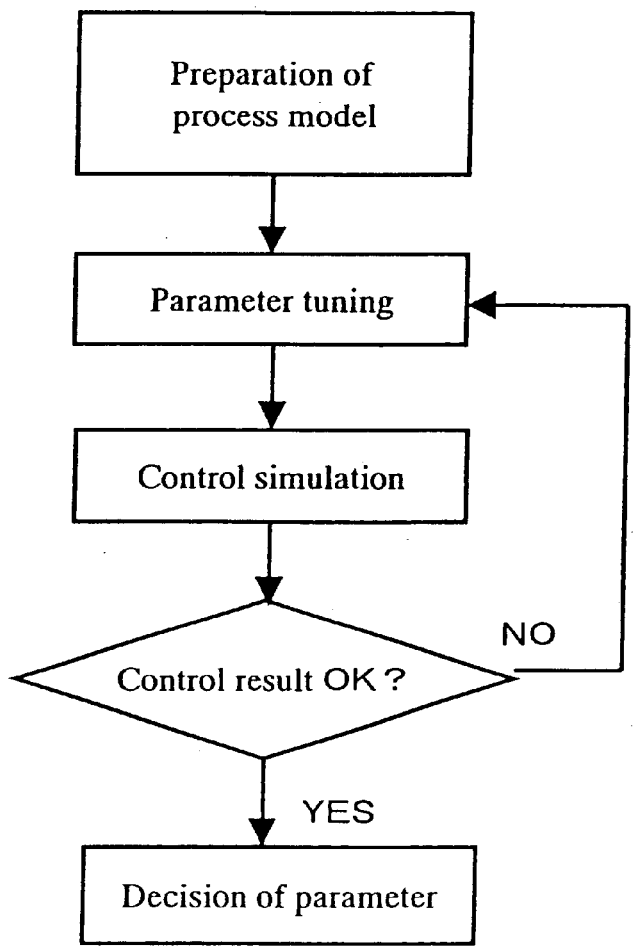
FIG. 5 is a flowchart showing a control means design method in an embodiment of the invention.

When the control means is designed, the control parameter is decided according to the method shown in FIG. 5. The control parameter to be decided depends on the design method. At first, a process model is prepared based on the process gains, interference rates and delay time decided according to the methods of the invention. Since the process gains in the edge portions of the film are smaller than those in the central portion, the control parameter is adjusted to keep the control gains in the edge portions larger than those in the central portion, and the process model is used to simulate the changes of sheet thickness. If the control performance such as the control accuracy and the responsiveness obtained by the simulation is better than the preset standard values, the design parameter concerned is employed. If the control performance is not good, the control parameter is re-adjusted to carry out the simulation. This work is repeated to decide the optimum control parameter.

If a process model prepared according to the invention is used to simulate the changes of sheet thickness for deciding the control parameter of the control means as described above, a sheet can be produced efficiently since it can be avoided to decide the control parameter by trial and error while forming the sheet.

If a process model suitable for the central portion and the edge portions respectively is used for control as described above instead of controlling the sheet uniformly entirely in the transverse direction of the sheet, the sheet thickness can be controlled accurately and stably even at the edge portions of the sheet that are likely to be affected by the neck-in phenomenon and the polymer flow at the die edge portions, hence likely to be unstably controlled.

Meanwhile, since the die 4 is provided with integral lips in the transverse direction of the sheet, the manipulated variable applied to each thickness adjusting means 10 also affects the positions of the near thickness adjusting means. So, in a state where the differences between the manipulated variables of the respective near thickness adjusting means are excessively large, even if the differences between the manipulated variables of the respective near thickness adjusting means are made larger, the form of the gap cannot follow the differences of manipulated variables. For this reason, the manipulated variables can less affect the changes of gap form of the die, and since the gap adjusting capability becomes low, the sheet thickness control accuracy declines.

Therefore, in the sheet production process of the invention, in the case where the number of thickness adjusting numbers is N (N: a natural number of 2 or more), it is preferable that in the case where the differences between the computed manipulated variable of the i-th (i=1, 2, ..., N) thickness adjusting means and the manipulated variables delivered to the thickness adjusting means near said means are not smaller than a predetermined value T, the manipulated variable delivered to said i-th thickness adjusting means is corrected to keep the differences of manipulated variables smaller, while the manipulated variables delivered to said near thickness adjusting means are corrected based on a static process model expressing the static relation between manipulated variables to be delivered and the sheet thickness values at the position corresponding to the respective thickness adjusting means, to be obtained by the manipulated variables after lapse of a sufficient time, and that the corrected respective manipulated variables are delivered to said respective thickness adjusting means.

Figure 8:
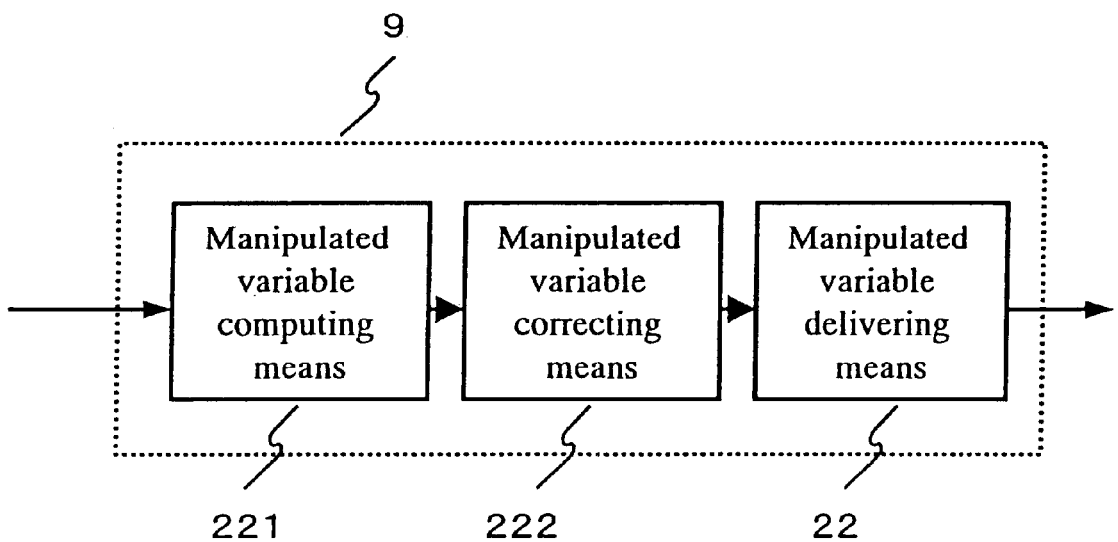
FIG. 8 is a diagram showing the details of a control means in an embodiment of the invention.

The control means 9 has a manipulated variable computing means 221, manipulated variable correcting means 222 and manipulated variable delivering means 223 as shown in FIG. 8. The manipulated variable computing means 221 computes manipulated variables according to a predetermined control algorithm, and the manipulated variable correcting means 222 corrects manipulated variables when it is necessary to correct them. The manipulated variable delivering means 223 delivers the respective corrected values actually to the thickness adjusting means 10.

In the manipulated variable computing means 221, it is preferable to perform conversion processing such as filter processing for the deviation data that are differential values between the thickness distribution of the sheet 1 and the desired thickness distribution. For the filter processing, such a method as the moving-averaging in the same direction as the transverse direction of the sheet or the weighted-averaging with the deviation data obtained before the present time point can be used.

In most cases, the number of the thickness adjusting means 10 arranged in the transverse direction of the sheet is smaller than the number of said deviation data. In such a case, the data corresponding to the respective thickness adjusting means are taken from the filter-processed deviation data. In this case, it is desirable to obtain beforehand the corresponding positions between the respective thickness adjusting means 10 and the deviation data.

Furthermore, the manipulated variable computing means 221 computes the manipulated variables for the filter-processed deviation data reduced to as many as the thickness adjusting means, for controlling the thickness adjusting means 10.

Figure 7:
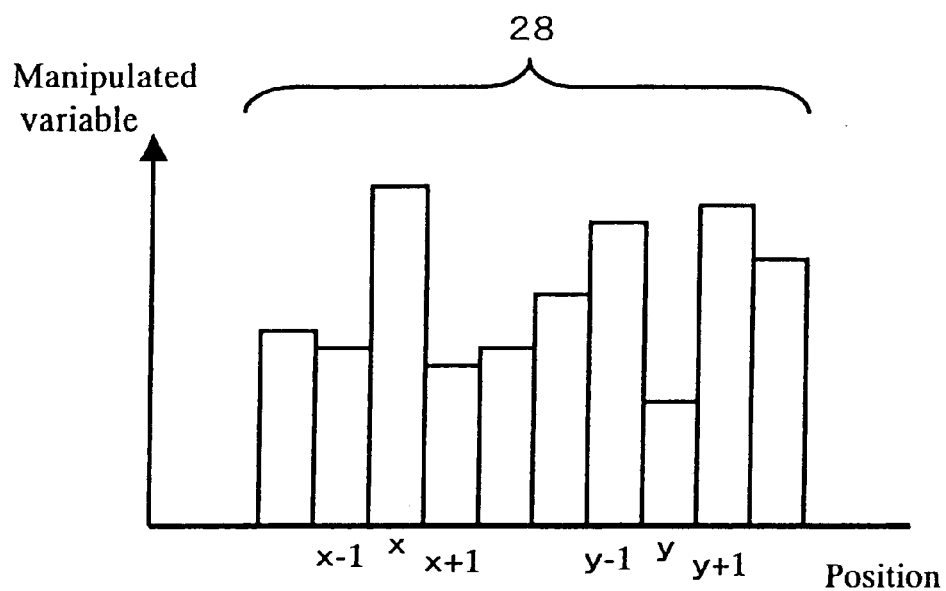
FIG. 7 is a diagram showing a pattern of manipulated variables in an embodiment of the invention.

In the case where the sheet thickness is controlled by the above-mentioned method, it can happen that the manipulated variable delivered to a thickness adjusting means is excessively large or small compared with the manipulated variables delivered to near thickness adjusting means. FIG. 7 shows an example of manipulated variables 28 delivered to respective thickness adjusting means 10. The position of each thickness adjusting means is selected as the abscissa, and the magnitude of the manipulated variable, as the ordinate. The magnitude of the manipulated variable can be, for example, the rate of time during which a certain heat quantity is delivered to the thickness adjusting means concerned or the magnitude of the heat quantity delivered to the thickness adjusting means concerned during a predetermined period of time. In the diagram, the manipulated variable of the thickness adjusting means of position x or y is excessively larger or smaller than the manipulated variables a delivered to the thickness adjusting means of the near positions x−1 and x+1, or y−1 and y+1.

The method of leveling the manipulated variables in this pattern of manipulated variables is described below.

If the manipulated variable 21 delivered to the i-th thickness adjusting means $10_i$ (i=1, 2, ..., N) is $u_i$ and the measured thickness value at the position corresponding to each thickness adjusting means $10_i$ at the moment when the manipulated variable is delivered is $y_i$ (i=1, 2, ..., N), then the static mathematical relation between $u_i$ and $y_i$ is, for example, as shown in formulae 19 and 20. The static mathematical relation refers to the relation between sheet thickness values and manipulated variables occurring after lapse of a sufficient time subsequently to the application of the manipulated variables to the thickness adjusting means. In the formulae, A is an interference matrix, being a matrix with a size of N×N expressing the interferences between individual thickness adjusting means. In formula 20, $\alpha_1$ ($\geq 0$) is the rate at which the sheet thickness values at the positions corresponding to both the first adjacent thickness measuring means change, and $\alpha_2$ ($\geq 0$) is the rate at which the sheet thickness values at the positions corresponding to both the second adjacent thickness adjusting means change. In the above formula, the rate at which the sheet thickness values at the positions corresponding to both the third and farther adjacent thickness adjusting means change is assumed to be 0, but $\alpha_3$ ($\geq 0$) and rates of farther thickness adjusting means may also be considered. Furthermore, the values of $\alpha_1$ and $\alpha_2$ of respective rows can also be different from row to row.

Formula 19:

$$\begin{bmatrix} y_1 \\ y_2 \\ \vdots \\ y_N \end{bmatrix} = A \begin{bmatrix} u_1 \\ u_2 \\ \vdots \\ u_N \end{bmatrix}$$

Formula 20:

$$A = \begin{bmatrix} 1 & \alpha_1 & \alpha_2 & 0 & \cdots & \cdots & \cdots & & 0 \\ \alpha_1 & 1 & \alpha_1 & \alpha_2 & 0 & & & & 0 \\ \alpha_2 & \alpha_1 & 1 & \alpha_1 & \alpha_2 & 0 & & & 0 \\ 0 & \alpha_2 & \alpha_1 & 1 & \alpha_1 & \alpha_2 & 0 & & 0 \\ 0 & 0 & \alpha_2 & \alpha_1 & 1 & \alpha_1 & \alpha_2 & \ddots & \vdots \\ 0 & & & \ddots & \ddots & 1 & \ddots & \ddots & \vdots \\ \vdots & & & & \ddots & \ddots & \ddots & \ddots & \vdots \\ \vdots & & & & & \ddots & & \ddots & \alpha_2 \\ \vdots & & & & & & \ddots & \alpha_2 & \alpha_1 & 1 & \alpha_1 \\ 0 & & \cdots & \cdots & \cdots & & 0 & \alpha_2 & \alpha_1 & 1 \end{bmatrix}$$

Considered is a case where the manipulated variables of the j-th thickness adjusting means $10_j$ and respectively M thickness adjusting means on both sides, $10_{j-M}$, $10_{j-M+1}$, ..., $10_{j-1}$, $10_{j+1}$, ..., $10_{j+M-1}$ and $10_{j+M}$ are corrected and leveled.

Assume that the correction rate of the manipulated variable delivered to the thickness adjusting means $10_j$ is a and that the correction rates of the manipulated variables delivered to 2M thickness adjusting means $10_{j-M}$, $10_{j-M+1}$, ..., $10_{j-1}$, $10_{j+1}$, ..., $10_{j+M-1}$ and $10_{j+M}$ are $b_i$ (i=−M, −M+1, ..., −1, 1, ..., M−1, M). The following describes, for simplification, a method of correcting the manipulated variables delivered to respectively two thickness measuring means on both sides of the thickness adjusting means $10_j$ with M=2, but this method is applicable for cases other than M=2 and cases where the numbers of thickness adjusting means on both sides of the thickness adjusting means $10_j$ are different. In these cases, the formulae shown below can be changed as required to obtain the correction rates for leveling the manipulated variables.

If corrected manipulated variables are delivered to thickness adjusting means $10_{j-2}$, $10_{j-1}$, $10_j$, $10_{j+1}$, and $10_{j+2}$, the sheet thickness values corresponding to the respective thickness adjusting means change by $\Delta y_i$ (i=j−2, j−1, j, j+1, j+2). If it is assumed that even if the corrected manipulated variables are applied to the thickness adjusting means $10_{j-2}$, $10_{j-1}$, $10_j$, $10_{j+1}$ and $10_{j+2}$, the sheet thickness values little change, the following formula holds.

Formula 21:

$$\begin{bmatrix} \Delta y_1 \\ \Delta y_2 \\ \Delta y_3 \\ \Delta y_4 \\ \Delta y_5 \end{bmatrix} = \begin{bmatrix} \varepsilon_1 \\ \varepsilon_2 \\ \varepsilon_3 \\ \varepsilon_4 \\ \varepsilon_5 \end{bmatrix} = A' \begin{bmatrix} b_1 \\ b_2 \\ a \\ b_3 \\ b_4 \end{bmatrix}$$

In the above formula, A' is the portions corresponding to the thickness adjusting means $10_i$ (i=j−2, j−1, j, j+1, j+2) to be corrected in manipulated variable, extracted from A, and expresses the process model near the positions. The value of $\varepsilon_i$ (i=1, 2, ..., 5) is 0 or a finite value close to 0, preferably not more than 1.0% of the desired sheet thickness.

As a method for obtaining $b_i$ when a is given, it is preferable to solve the following formulae 22 through 24 with $\varepsilon_i=0$ (i=1, 2, ..., 5). Furthermore, a recurrence formula can be solved with $\varepsilon_i$ (i=1, 2, ..., 5) assumed to be infinite, or a recurrence formula can be solved with $\varepsilon_i$ (i=1, 2, ..., 5) assumed to be close to 0.

Formula 22:

$$\begin{bmatrix} b_1 \\ b_2 \\ b_3 \\ b_4 \end{bmatrix} = a \cdot A''^{+} \begin{bmatrix} \alpha_2 \\ \alpha_1 \\ 1 \\ \alpha_1 \\ \alpha_2 \end{bmatrix}$$

In the above formula, $A''^{+}$ is a quasi inverse matrix of $A''$ and can be obtained from formula 23.

Formula 23:

$$A''^{+} = (A''^T A'')^{-1} A''^T$$

where

Formula 24:

$$A'' = \begin{bmatrix} 1 & \alpha_1 & 0 & 0 \\ \alpha_1 & 1 & \alpha_2 & 0 \\ \alpha_2 & \alpha_1 & \alpha_1 & \alpha_2 \\ 0 & \alpha_2 & 1 & \alpha_1 \\ 0 & 0 & \alpha_1 & 1 \end{bmatrix}$$

The above formulae 22 through 24 can be generalized into the following formulae 25 and 26.

Formula 25:

$$\begin{bmatrix} \Delta y_{-M1} \\ \Delta y_{-M1+1} \\ \vdots \\ \Delta y_{-1} \\ \Delta y_0 \\ \Delta y_1 \\ \vdots \\ \Delta y_{M2-1} \\ \Delta y_{M2} \end{bmatrix} = \begin{bmatrix} \varepsilon_{-M1} \\ \varepsilon_{-M1+1} \\ \vdots \\ \varepsilon_{M2-1} \\ \varepsilon_{M2} \end{bmatrix} = A' \begin{bmatrix} b_{-M1} \\ b_{-M1+1} \\ \vdots \\ b_{-1} \\ a \\ b_1 \\ \vdots \\ b_{M2-1} \\ b_{M2} \end{bmatrix}$$

Formula 26:

$$\begin{bmatrix} b_{-M1} \\ b_{-M1+1} \\ \vdots \\ b_{-1} \\ b_1 \\ \vdots \\ b_{M2-1} \\ b_{M2} \end{bmatrix} = a \cdot A''^{+} \begin{bmatrix} 0 \\ \vdots \\ 0 \\ \alpha_2 \\ \alpha_1 \\ 1 \\ \alpha_1 \\ \alpha_2 \\ 0 \\ \vdots \\ 0 \end{bmatrix}$$

$A''^{+}$ is a quasi-inverse matrix of $A''$, and $A''$ is a matrix obtained by extracting the portion of (j+M2, j+M2) from the elements (j−M1, j−M1) of matrix A and excluding the j-th column of A.

If the above formulae are solved, the correction rates of the manipulated-variables can be derived and the manipulated variables can be leveled with the sheet thickness little changed.

In the execution of leveling, it is preferable that the correction rate a of the manipulated variable applied to the j-th thickness adjusting means is not larger than 10% of the manipulated variable applied to the j-th thickness adjusting means. In the case where 10% or more of correction is needed, it is preferable to carry out the leveling plural times by several percent each. In this case, it is desirable that the leveling subsequent to the completion of one time of leveling is carried out after the sheet thickness becomes stable.

As for the timing of leveling, after the control computation has produced the manipulated variables to be delivered to the respective thickness adjusting means, the correction rates can be added to the manipulated variables. Alternatively the correction rates can be obtained after the manipulated variables have been applied to the thickness adjusting means before the next manipulated variables are delivered, and added to the manipulated variables obtained in the next control computation, to deliver the corrected manipulated variables to the thickness adjusting means.

An example of automatically leveling during thickness control is described below based on FIG. 9. The following also describes, for simplification, a method of correcting the manipulated variables of the respectively two thickness adjusting means on both sides of a thickness adjusting means 10 with Ml M2=2 in formula 25.

At first, the control means 9 computes manipulated variables $u_k$ (k=1, 2, ..., N) (step 1). Then, the difference $D_k$ (=$u_{k+1}-u_k$) between the manipulated variable $u_k$ delivered to the thickness adjusting means $10_k$ at every position k and the manipulated variable $u_{k+1}$ delivered to the thickness adjusting means $10_{k+1}$ at position k+1 is obtained (step 2).

In step 3, the respective absolute values of $D_k$ and $D_{k+1}$ are compared with a predetermined threshold value, and the signs of $D_k$ and $D_{k-1}$ are examined.

Then, if the absolute values of $D_k$ and $D_{k+1}$ are larger than the predetermined threshold value and $D_k$ and $D_{k+1}$ are different in sign, that is, if the manipulated variable applied to the thickness adjusting means of position k+1 is excessively larger or smaller than the manipulated variables applied to both the adjacent thickness adjusting means, then a correction rate a, the magnitude of which is not larger than 10% of the manipulated variable applied to the thickness adjusting means $10_{k-1}$ at position k+1, is applied to make the difference smaller, and the correction rates $b_i$ (i=k−1, k, k+2, k+3) delivered to the near thickness adjusting means $10_{k-1}$, $10_k$, $10_{k+1}$, $10_{k+2}$ and $10_{k+3}$ are obtained based on the formula 26 (step 4). Then, the correction rates are applied to the corresponding manipulated variables (step 5).

Subsequently, with the position changed from k to k=k+2M+1 (step 6), that is, for the thickness adjusting means adjacent to the position apart enough not to doubly correct manipulated variables, steps 3 through 5 are carried out.

The above steps are repeated till k≧N is reached (step 7), and the corrected manipulated variables are actually delivered to the thickness adjusting means (step 8).

Other methods of deciding the positions of the thickness adjusting means, the correction rates of which are obtained based on $D_k$, include a method of deciding for a predetermined number of adjusting means selected in the descending order of absolute value of $D_k$ and a method of deciding based on the absolute value of the product of adjacent differences $D_k$ or the sum of the absolute values of adjacent differences $D_k$, etc.

In the above method, the correction rate a can be set at a constant rate to the manipulated variable to be corrected, or can also be derived in response to the difference between the manipulated variables of adjacent thickness adjusting means, i.e., based on the magnitude of $D_i$.

Furthermore, in addition to said a, $b_i$ can also be given beforehand like a, to derive other correction rates.

In the above method, leveling is carried out every control cycle, but can also be carried out intermittently.

Another method for leveling a pattern of manipulated variables is described below.

In the case where the number of thickness adjusting means is N (N: a natural number of 2 or more), it is also preferable to correct the manipulated variables delivered to consecutive M thickness adjusting means (M: a natural number of 2 to N) based on a process model that expresses the relation between the manipulated variables to be delivered and the sheet thickness values to be obtained by the manipulated variables, in order to minimize the dispersion of the manipulated variables to be delivered to said consecutive M thickness adjusting means among the manipulated variables of the N thickness adjusting means.

If the manipulated variables to be delivered to the consecutive M (M≦N) thickness adjusting means $10_i$ (i=1, 2, ..., M) among the N thickness adjusting means are $u'_i$ and the sheet thickness changes corresponding to the respective thickness adjusting means $10_i$ at the moment when the manipulated variables are delivered are $y'_i$ (i=1, 2, ..., M), then the process model can be expressed by Y'=B'U'. That is, the static mathematical relation between $u'_i$ and $y'_i$ is as shown, for example, by formulae 27 and 28.

Formula 27:

$$\begin{bmatrix} y'_1 \\ y'_2 \\ \vdots \\ y'_N \end{bmatrix} = A' \begin{bmatrix} u'_1 \\ u'_2 \\ \vdots \\ u'_N \end{bmatrix}$$

Formula 28:

$$A' = \begin{bmatrix} 1 & \beta_{11} & \beta_2 & 0 & \cdots & \cdots & \cdots & & & 0 \\ \beta_1 & 1 & \beta_1 & \beta_2 & 0 & & & & & 0 \\ \beta_2 & \beta_1 & 1 & \beta_1 & \beta_2 & 0 & & & & 0 \\ 0 & \beta_2 & \beta_1 & 1 & \beta_1 & \beta_2 & 0 & & & 0 \\ 0 & 0 & \beta_2 & \beta_1 & 1 & \beta_1 & \beta_2 & \ddots & & \vdots \\ 0 & & & \ddots & \ddots & 1 & \ddots & \ddots & \ddots & \vdots \\ \vdots & & & & \ddots & \ddots & \ddots & \ddots & \ddots & \vdots \\ \vdots & & & & & \ddots & & \ddots & & \beta_2 \\ \vdots & & & & & & \ddots & \beta_2 & \beta_1 & 1 & \beta_1 \\ 0 & & \cdots & \cdots & \cdots & & & 0 & \beta_2 & \beta_1 & 1 \end{bmatrix}$$

In the above formulae, A' is an interference matrix, being a matrix with a size of M×M expressing the interferences between individual thickness adjusting means. In formula 28, $\beta_1$ (≧0) is the rate at which the sheet thickness values at the positions corresponding to both the first adjacent thickness measuring means change when a manipulated variable is changed at a certain thickness adjusting means, and $\beta_2$ (≧0) is the rate at which the sheet thickness values at the positions corresponding to both the second adjacent thickness adjusting means change. In the above formula, the rate at which the sheet thickness values at the positions corresponding to both the third and farther adjacent thickness adjusting means change is assumed to be 0, but $\beta_3$ (≧0) and the rates of farther thickness adjusting means may also be considered. Furthermore, the values of $\beta_1$ and $\beta_2$ of respective rows can also be different from row to row.

Figure 10:
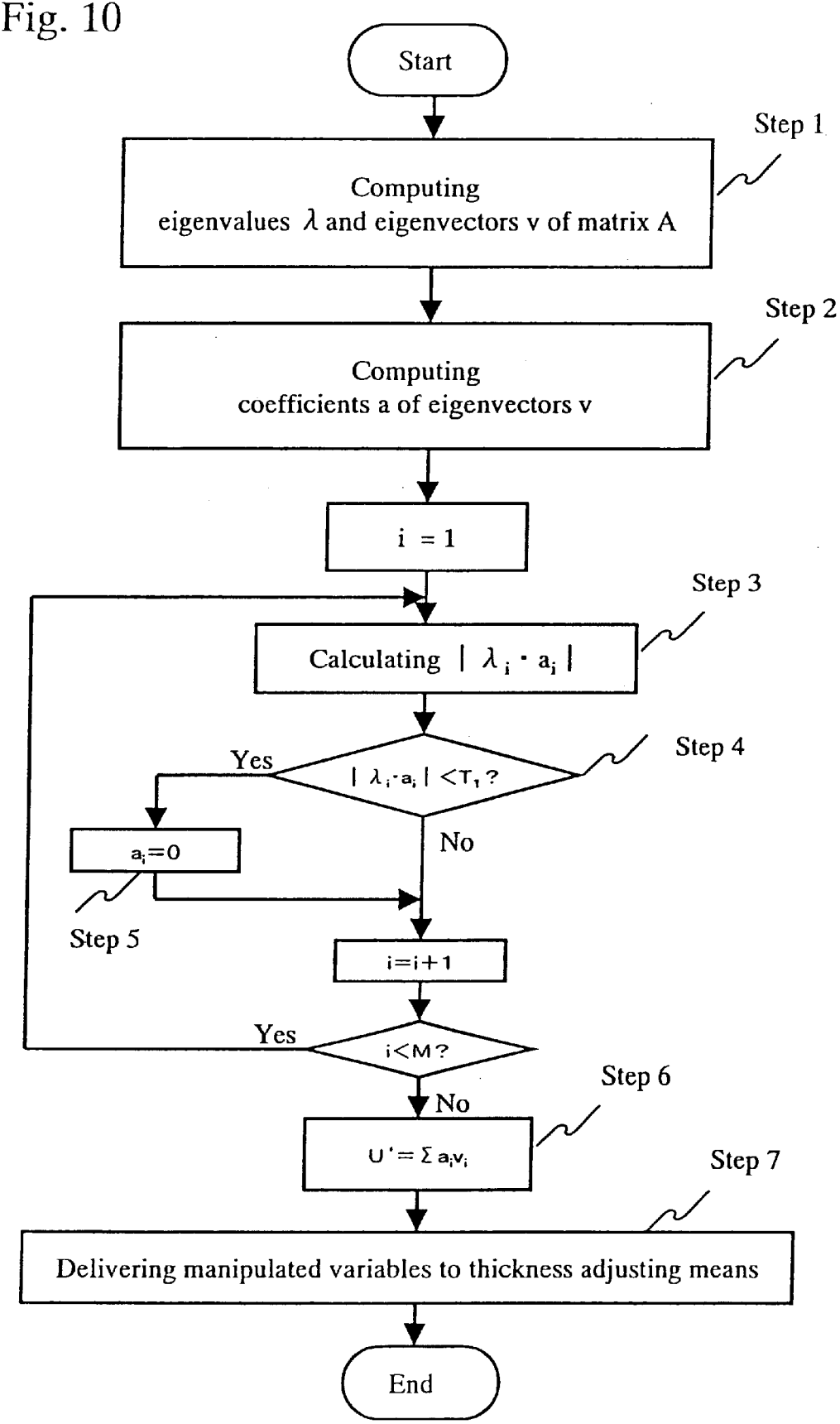
FIG. 10 is a flowchart for leveling the manipulation variables in an embodiment of the invention.

A method of correcting the manipulated variables to be delivered to the consecutive M thickness adjusting means for leveling the manipulated variables is described below based on FIG. 10.

The manipulated variables $(u'_1, u'_2, \ldots, u'_M)^T$ not yet corrected and to be delivered to the respective thickness adjusting means $10_j$ are considered as vector U'.

At first, M pairs of eigenvalues $\lambda_i$ (i=1, 2, ..., M) and eigenvectors $v_i$ (i=1, 2, ..., M) of the interference matrix A' are obtained (step 1). Furthermore, the magnitudes of the eigenvectors are normalized to 1. In this case, A' is a square matrix of M×M, and assumed is rank (A')=M.

In this case, U can be expressed as follows, as the linear combination of eigenvectors $v_i$.

Formula 29:

$$U' = \sum_{i=1}^{M} a_i v_i$$

In the above formula, $a_i$ is coefficients expressing the degrees at which eigenvectors $v_i$ are contained in U', and is obtained from the following formula (step 2).

Formula 30:

$$(a_1, a_2, \ldots a_M)^T = (v_1 v_2 \ldots v_M)^{-1} U$$

In this case, the change of thickness $y'_i$ by the change of manipulated variables u can be expressed as follows using $v_i$, $\lambda_i$ and $a_i$.

Formula 31:

$$Y' = \sum_{i=1}^{N} a_i \lambda_i v_i$$

Components relatively small in the magnitude of the product $|a_i\lambda_i|$ of coefficient $a_i$ and eigenvalue $\lambda_i$, of the eigenvectors $v_i$ are large in the influence on the dispersion of manipulated variables and small in the influence on the sheet thickness. So, even if $a_i\lambda_i=0$ is assumed, the magnitude of sheet thickness Y' little changes.

Then, $|a_i\lambda_i|$ is evaluated with a preset threshold value $T_1$ ($0<T_1<1$), and if the following equation is satisfied, assumed is $a_i=0$ (steps 3 through 5).

Formula 32:

$$|a_i\lambda_i| < \max_j(|a_j\lambda_j|) \cdot T_1$$

,where $\max_j(|a_j\lambda_j|)$ is the maximum value of $|a_j\lambda_j|$ (j=1, 2, ..., M).

The $a_i$ (i=1, 2, ..., M) corrected as described above is introduced into the following formula, to derive corrected manipulated variable vector U=''' (step 6).

Formula 33:

$$U'' = \sum_{i=1}^{N} a_i \cdot v_i$$

If the manipulated variables are corrected according to the above formula, the manipulated variables can be leveled with the sheet thickness little changed. If the threshold value $T_i$ is made larger, the degree of leveling can be enhanced since many kinds of frequency components can be removed from the manipulated variable vector U', but the influence on the sheet thickness tends to be larger. On the other hand, if the threshold value $T_1$ is made smaller, the influence on the sheet thickness can be lessened, but the degree of leveling tends to be lower. It is preferable that the threshold value $T_1$ is 0.01 to 0.5.

Furthermore, instead of changing the eigenvectors $v_i$ to be removed from the manipulated variable vector U' while depending on $a_i$, the manipulated variables can also be corrected using said formula 33, assuming that the $a_i$ corresponding to the eigenvalue $\lambda_i$ satisfying the following formula is 0.

Formula 34:

$$|\lambda_i| < \max_j(|\lambda_j|) \cdot T_2$$

where $0<T_2<1$, preferably $0.01 \leq T_2 \leq 0.5$.

Finally, the corrected manipulated variables are delivered to the thickness adjusting means (step 7).

In the invention, the leveling can be carried out every control cycle, but can also be carried out intermittently. Furthermore, carrying out the leveling in the case where a certain condition is satisfied is also a preferable mode. For example, it is preferable to carry out leveling in the case where the variance of the manipulated variables delivered to consecutive M thickness adjusting means has become larger than a preset value, or in the case where the difference between the maximum value and the minimum value of the manipulated variables delivered to M thickness adjusting means becomes larger than a preset value, or in the case where the difference between the manipulated variables delivered to adjacent thickness adjusting means becomes larger than a preset value.

In the invention, the number M of the thickness adjusting means to be leveled is 2 to N. A case of M=N, i.e., where M is equal to the number of all the thickness adjusting means (N), is preferable since the manipulated variables of all the thickness adjusting means can be leveled as a package. M can also be set at any desired values smaller than N. In this case, since computation covers only the portions that must be leveled, computation can be simplified.

Another preferable embodiment in which the invention is applied to the production of a plastic film is described below.

The thickness adjusting means 10 can be any of heat bolt method, lip heater method, etc. In the heat bolt method, heat quantities are given to heat bolts, to change their temperatures, thereby thermally expanding or contracting them, for adjusting the gap 11 of the die 4. In the lip heater method, lip heaters are used to change the temperatures of the polymer, to change the viscosities of the polymer so that the amounts of the polymer extruded from the die 4 can be changed to adjust the thickness values of the sheet 1.

As described above, in the heat bolt method and the lip heater method, the temperature is adjusted to adjust the sheet thickness.

In the heat bolt method, if the temperature of each thickness adjusting means 10 is raised, the sheet thickness becomes thinner since the gap of the die is narrowed. On the contrary, in the lip heater method, if the temperature is raised, the sheet thickness becomes thicker since the viscosity of the polymer declines to increase the amount extruded from the die.

In the method of controlling the sheet thickness values by controlling the temperatures of heating type thickness adjusting means, when the temperatures are raised, the thickness adjusting means 10 are forcibly heated, for example, by applying electric powers as described above, but when the temperatures are lowered, the thickness adjusting means 10 are naturally allowed to cool in most cases.

In the above-mentioned method, the change of the sheet thickness with the lapse of time when the temperature is raised is different from that when the temperature is lowered. Compared with the case of raising the temperature, the change of the sheet thickness with the lapse of time occurs slowly when the temperature is lowered.

So, in the case where heating type thickness adjusting means are used and where the manipulated variables are controlled by controlling the heat quantities applied to the heating type thickness adjusting means, it is preferable that the variations of the heat quantities are made larger when the heat quantities are decreased than when they are increased.

In the control means 9 of this embodiment, as shown in FIG. 4, the manipulated variable computing means 21 computes the heat quantities 23 based on the differential values 25 between the measured thickness values 24 and the desired thickness values of the sheet 1, and the computed heat quantities are applied to the thickness adjusting means 10 of the sheet production process 26. In many cases, since electric heaters are used, the heat quantities are given as electric currents applied to the heating type thickness adjusting means.

The control means 9 computes the heat quantities based on the filter-processed deviation data reduced to as many as the number of the thickness adjusting means, to control the thickness adjusting means 10.

The changes of sheet thickness caused when the temperatures of heat bolts or lip heaters are changed, and the method of computing the heat quantities in the invention are described below.

As described before, in the heat bolt method, if the temperatures of the thickness adjusting means 10 are raised, the sheet thickness values become smaller since the gap of the die become smaller. On the contrary, in the case of viscosity method, if the temperatures are raised, the sheet thickness values become larger since the viscosities of the polymer are lowered to increase the amounts extruded from the die.

The changes of sheet thickness with the lapse of time in the case of heating the thickness adjusting means 10 and in the case of cooling them in the heat bolt method are described below in reference to FIG. 12. To heat the thickness adjusting means 10, the heat quantities applied to the thickness adjusting means are increased. On the contrary, in the case of cooling the thickness adjusting means 10, the heat quantities applied to the thickness adjusting means are decreased.

Figure 12:
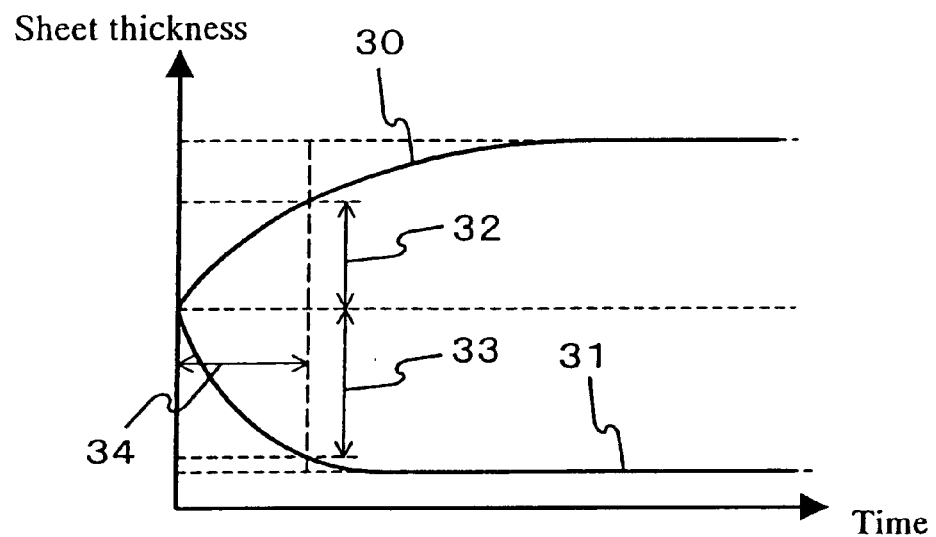
FIG. 12 is a diagram showing the change of sheet thickness with the lapse of time in the case where a heat bolts is alternately pushed or pulled, in an embodiment of the invention.

FIG. 12 is a schematic diagram showing the change 31 of sheet thickness with the lapse of time in the case of heating a heat bolt and the change 30 of sheet thickness with the lapse of time in the case of cooling the heat bolt, with the, same heat quantity variation given in reverse directions. It can be seen that the change of sheet thickness in the case of cooling the heat bolt is slow compared with that in the case of heating the heat bolt.

Figure 13:
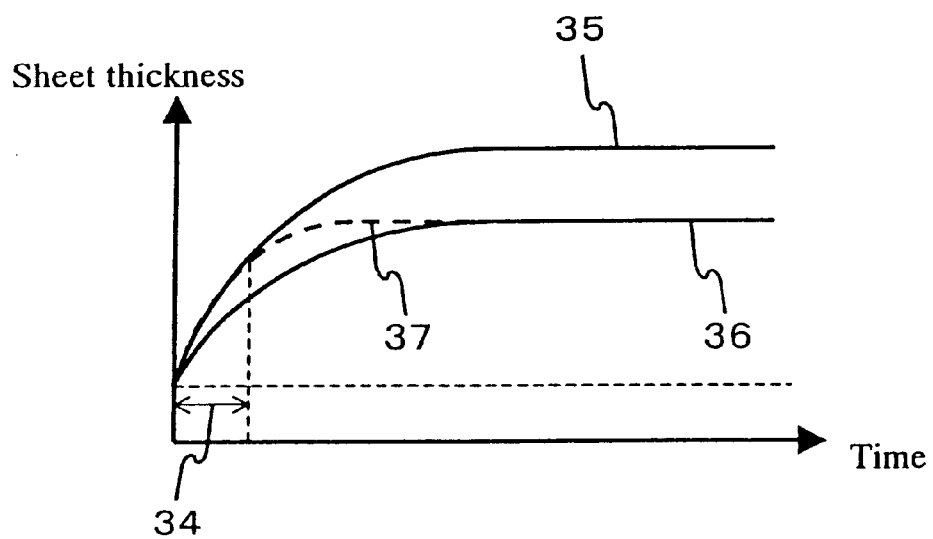
FIG. 13 is a diagram showing the change of sheet thickness with the lapse of time in the case where the heat quantity is large or small, in an embodiment of the invention.

Furthermore, FIG. 13 shows a schematic diagram showing the changes of sheet thickness with the lapse of time with the heat bolt cooled with a large heat quantity and a small heat quantity.

It can be seen that the sheet thickness change 35 in the case of a large heat quantity is faster than the sheet thickness change 36 in the case of a small heat quantity.

FIG. 13 also shows the sheet thickness change 37 with the lapse of time in the case where the heat quantity is small and where the time constant of the process is small i.e. the sheet thickness changes quickly. When a certain time 34 has elapsed after a heat quantity is applied to the thickness adjusting means 10, the sheet thickness variation is the same as that in the case where the heat quantity is large.

Figure 11:
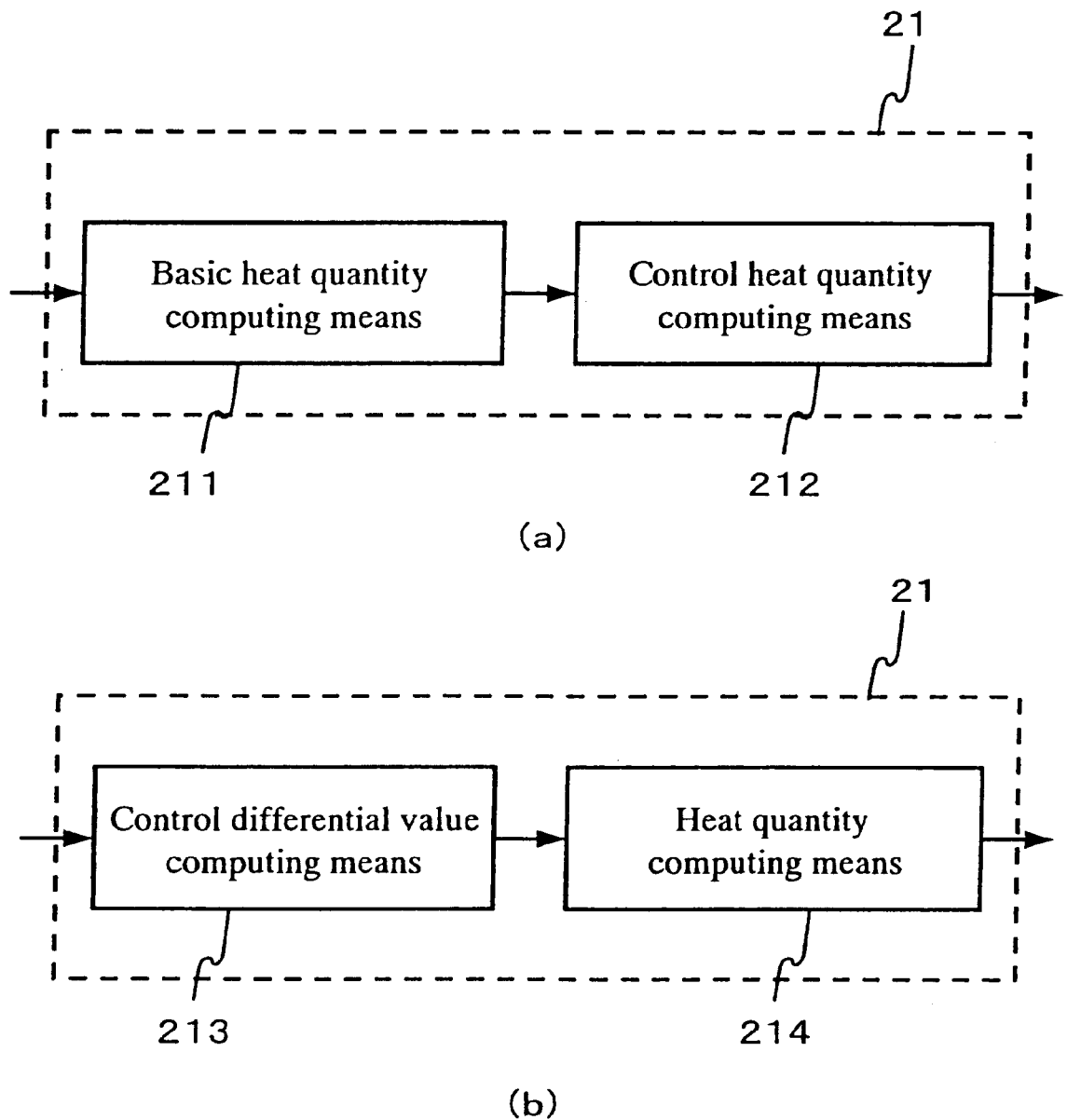
FIG. 11 is a block diagram showing a sheet thickness control process in an example of the invention.

Therefore, if the certain time 34 is a control cycle, it can be considered that the same sheet thickness change as that in the case where the time constant is small occurs in this control cycle if the heat quantity is made larger. That is, as shown in FIG. 11(*a*), if the basic heat quantity computing means 211 computes the variation of heat quantity (basic heat quantity) to be given on the assumption that the responsiveness during cooling is the same as that during heating in defiance of actually asymmetric responsiveness, and the heat quantity for control is obtained to ensure that the variation becomes γ times(γ>1), then the responsiveness in the case of cooling the heat bolt can be improved. In this case, the heat quantity in the case of cooling a heat bolt is made larger in reference to the case of heating the heat bolt, but on the contrary, the heat quantity in the case of heating the heat bolt can be made smaller in reference to the case of cooling the heat bolt (first mode).

Furthermore in FIG. 12, if the sheet thickness variation 33 in the case of heating the bolt occurring when a certain time 34, has elapsed after the application of a heat quantity to the thickness adjusting means 10 is compared with the sheet thickness variation 32 in the case of cooling the bolt, it can be seen that the sheet thickness variation 33 in the case of heating the bolt is larger.

So, in the case where a heat quantity is obtained based on the differential value between a measured thickness value and the desired value and where a control method of making the variation of heat quantity larger when the differential value is larger is employed, as shown in FIG. 11(*b*), if the control differential value computing means 213 converts the differential value during cooling to ensure that the differential value during cooling becomes α times (α>1) that during heating, for making the differential value for control beforehand, and subsequently the heat quantity computing means 214 computes the heat quantity as ordinary control computation, then the variation of heat quantity becomes large, and the responsiveness in the case of cooling the bolt can be enhanced as in the first mode (second mode).

Also in this case, on the contrary, in the case of heating, the control differential value between said measured value and said desired value used for cooling can be multiplied by β (0<β<1), to obtain the heat quantity and it can be applied to the heating type thickness adjusting means (third mode).

It is desirable that the above α, β and γ are decided considering the process gains, time constant of heating/cooling and control cycles. Furthermore, α, β and γ can also be variable depending on the magnitudes of the differences between desired thickness values and measured thickness values, instead of being constant values.

In the above example, added is a means of making asymmetric, the input or output of a control system that performs ordinary symmetric computation. However, the control system can be constituted to allow the computation of such asymmetric control output.

A further other preferable embodiment in which the invention is applied to the production of a plastic film is described below.

Figure 15:
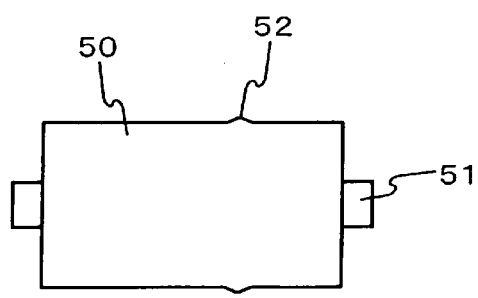
FIG. 15 is a side view of a produced roll having a winding mound.

In the equipment of producing a sheet such as a film, the sheet is wound around a winder, and slight roughness of the sheet in the transverse direction can cause a winding mound as shown in FIG. 15.

In the prior art, to prevent the occurrence of such a winding mound, an oscillator is installed upstream of the winder, to oscillate the sheet in the transverse direction, i.e., crosswise while the sheet is wound. If the sheet is oscillated crosswise to move thick portions crosswise in the transverse direction like this, the occurrence of a winding mound can be prevented.

If the sheet is wound while being moved crosswise as described above, the wound sheet cannot be uniform at the edges, and the winding looks awkward. In addition, there is a problem that the process into the secondary product is inconvenienced.

So, it is preferable to measure the thickness distribution of the sheet in the transverse direction, to obtain the integral values of the differences between the measured thickness distribution values and the first target values preset based on the desired outer diameter profile of the produced roll, to correct the second target values at respective portions in the transverse direction based on the integral values, and to control the manipulated variables applied to the thickness adjusting means using said evaluation function to lessen the differences between the second target values and the measured sheet thickness distribution values.

Figure 14:
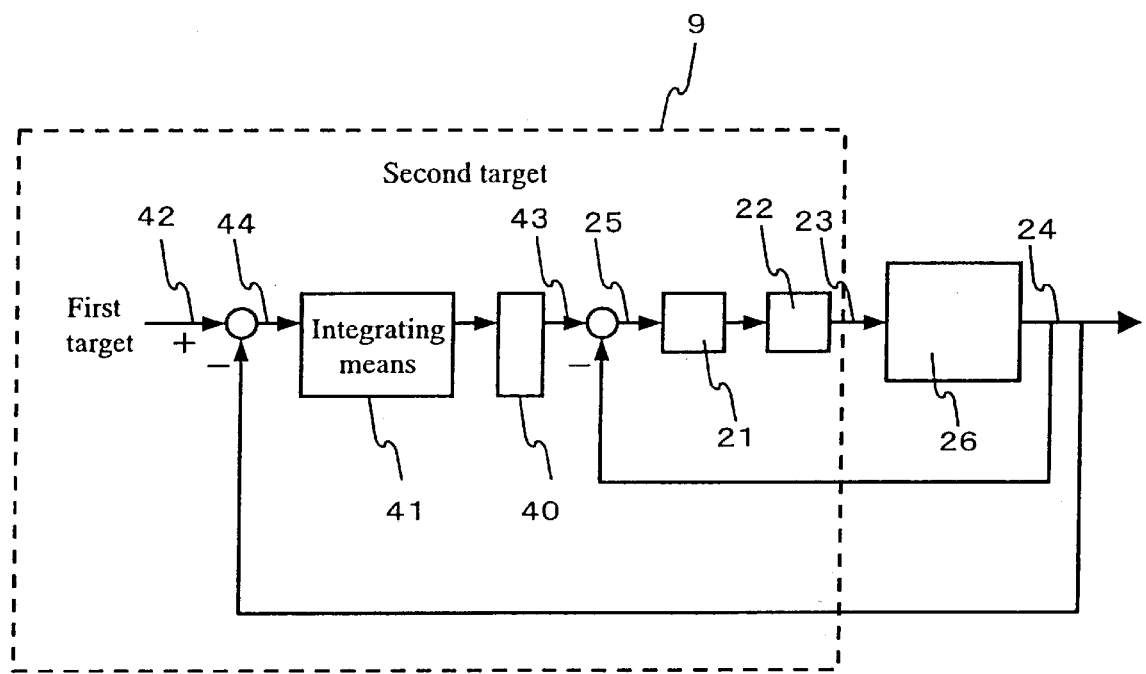
FIG. 14 is a block diagram showing a sheet thickness control process in an embodiment of the invention.

The action of the control means 9 is described below in detail in reference to FIG. 14. At first, an integrating circuit 41 integrates the deviations 44 between the measured thickness values 24 of the sheet formed according to the sheet production process measured by the thickness gauge 8 at the respective measuring positions after a given measuring start point, and the first target values 42 at the positions corresponding to the measured thickness values.

It is desirable that the values per sheet obtained by converting the desired outer diameter profile in the transverse direction of the produced roll are used as the first target values 42. The outer diameter profile can be, for example, flat or drum-shaped in the transverse direction, and any profile desired by the user can be set.

Then, a second target value correcting means 40 corrects the second target values at the positions corresponding to the integral values based on the integral values. As the second target values, for example, the desired thickness values of one sheet can be set. For correction, the second target values can be corrected at rates proportional to the magnitudes of the integral values, or PID control or the like can be used. In this case, it is desirable that an upper limit value and a lower limit value are preset for the second target values, to prevent that the second target values are corrected beyond the upper or lower limit value.

The manipulated variable computing means 21 derives the manipulated variables for the thickness adjusting means 10 in order to lessen deviations between said corrected second desired values 43 and the measured thickness values 24 using said evaluation function. However, it is preferable to filter-process the deviation data 25 beforehand. For the filter processing, such a method as the moving-averaging in the same direction as the transverse direction of the sheet or the weighted-averaging with the deviation data obtained before the present time point can be used. It is desirable to decide the manipulated variables depending on the situations in the production process, for example, to correct large thickness irregularity immediately after start of sheet production and to correct small thickness irregularity during stable production.

Furthermore, in most cases, the number of the thickness adjusting means 10 disposed in the transverse direction of the sheet is smaller than the number of measured deviation data. In such a case, the data corresponding to the respective thickness adjusting means are taken from the filter-processed deviation data. The data can be obtained using a function of thickness distribution and the fitting of the least square method, etc. When the number of measured data is sufficiently large, the corresponding data can also be obtained by simply thinning out. In this case, it is desirable to obtain the corresponding relation between the respective thickness adjusting means 10 and the measured thickness values 24 beforehand.

Then, the manipulated variable computing means 21 computes the manipulated variables 23 based on the filter-processed deviation data reduced to as many as the number of the thickness adjusting means, and the manipulated variable delivering means 22 delivers the manipulated variables 23 to the thickness adjusting means 10 of the sheet production equipment 26.

In the above method, all the number of the first desired values 42, the number of the second desired values 43, the number of measured thickness values 24, and the number of deviation data 44 and 25 are equal to the number of the thickness values measured by the thickness gauge 8, and the manipulated variable computing means 21 takes the values of the positions corresponding to the respective thickness adjusting means 10 and computes the manipulated variables based on these values. However, the first desired values 42, the second desired values 43, the measured thickness values 24 and the deviation data 44 and 25 can also be reduced to only the data of the positions corresponding to the respective thickness adjusting means 10 before hand. Furthermore, since the correction of the second desired values is not necessarily carried out frequently, when the integrating means 4 integrates the differences from the first desired values, it is not necessary to use the latest values at that moment. Therefore, the values measured at an adequately less frequency can be used, or the values measured by any other means than that for the measured values used in the manipulated variable computing means 21 can also be used. Moreover, the correction of second desired values can also be carried out at longer cycles.

Furthermore, depending on the characteristics peculiar to the process, it can happen that the first desired values are different from the outer diameter profile of the produced roll. In such a case, if the outer diameter profile in the transverse direction of the produced roll is measured and the first desired values are corrected based on the measured values, then the outer diameter profile of the produced roll can be improved. The outer diameter profile can be measured using a stylus method or laser displacement meter, etc. Since the winding diameter is small when little time has passed after start of winding, the velocity of increasing the winding diameter is wound more than when a certain time has passed after start of winding. So, when the winding diameter is small, the thickness irregularity affects the profile of the produced roll greatly. Therefore, if the correction rates of the second desired values are made smaller as the winding diameter of the sheet becomes larger, the sheet can be produced without being affected by the winding diameter.

Furthermore, in the sheet production process, there is a case where after a roll with a length as long as integer times a certain length is produced and slit, and each of the slit rolls is rewound into plural rolls each having said certain length. In this case, it is preferable that the profiles of all the produced rolls are good. Therefore, in the case where plural rolls each having a certain length are rewound from one produced roll, it is preferable to integrate and reset for every said certain length, and to newly obtain the integral values of the differences between the measured values and preset first desired values. The winding length till resetting is not required to be always constant, and the resetting can be carried out whenever any adequately necessary predetermined value has been reached.

One of the causes to worsen the winding appearance of a roll is the thickness irregularity of the sheet. However, the conventional thickness irregularity decreasing technique as described above has various problems. The inventors studied intensively and as a result found that if a specific component of sheet thickness irregularity is selectively decreased, a slightly wrinkled or streaked roll with a good roll form can be obtained without changing the properties of the sheet with high productivity sustained. Particularly, the thickness profile in the transverse direction of the sheet is measured and Fourier-transformed into a power spectrum resolved into wave numbers, and the sheet thickness is controlled to ensure that the mean value X1 of the powers of smaller than a predetermined wave number a becomes $0.2 \times T^2$ or less and not larger than the mean value X2 of the powers of wave number a and more in said power spectrum. According to a study of the inventors, the influence of the component of smaller than a specific wave length on the winding appearance is large, and if the mean value X1 of the powers of smaller than said wave number a is $0.2 \times T^2$ or less, the irregularity of the winding appearance of the roll formed by winding the sheet can be kept very small. In this case, T is the mean thickness ($\mu$m) of the sheet. It is preferable that X1 is $0.1 \times T^2$ or less. Furthermore, if the mean value X2 of the powers of said wave number a and larger is larger than the mean value X1 of said powers, high productivity can be sustained without changing the properties of the sheet. A range of $X1 \leq 0.5 \times X2$ is preferable, and a range of $X1 \leq 0.2 \times X2$ is more preferable.

The predetermined wave number a can be set depending on the kind of the sheet and production conditions, and it is preferable that the wave number is any optional value selected in a range from 3 m$^{-1}$ to 30 m$^{-1}$. The low frequency component of smaller than this wave number worsens the winding appearance of the roll since the thickness irregularity is accumulated. On the other hand, the high frequency component of larger than this wave number does not affect the winding appearance of the roll so much.

The invention is described below in reference to drawings based on an embodiment where the invention is applied to the production of a plastic film.

The method of measuring the thickness profile of a plastic film (hereinafter simply called the film) in the transverse direction is as described below. For example, several sheets to tens of sheets are cut out from optional winding layers of a produced roll, and the thicknesses of discretely sampled portions can be measured, for example, using a contact measuring instrument. It is preferable that the sampling intervals are 1 mm or less. Furthermore, the measurement can also be carried out at different positions in the longitudinal direction of the film, to average the power spectra obtained in the respective times of measurement.

The obtained thickness profile of the sheet in the transverse direction are Fourier-transformed according to the following formula, to obtain the power spectrum P of the respective wave numbers.

$$P = F(\omega)(F(\omega))^*$$

$$F(\omega) = \int_{-\infty}^{\infty} f(x)e^{-j\omega x} dx$$

where f(x) is the thickness profile of the sheet in the transverse direction (in $\mu$m); $F(\omega)$ is the Fourier transform of f(x); x is a position in the transverse direction of the sheet (in $\mu$m); $\omega$ (in m$^{-1}$) is a wave number; and $F(\omega)^*$ is a conjugate complex number; and j is an imaginary number, and $j^2 = -1$.

The mean value X1 of the powers of a predetermined wave number a and larger and the mean value X2 of the powers of smaller than the wave number a are obtained as described below. That is, X1 is the mean value of the powers whose wave number is more than 0 and smaller than the wave number a, and shows the degree to which the thickness irregularity of the low frequency component is contained in the film. X2 is the mean value of the powers of the predetermined wave number a and larger, and shows the degree to which the thickness irregularity of the high frequency component is contained in the film. The upper limit of the wave number computed when X2 is obtained can be the upper limit of the obtained power spectrum. However, if too high wave numbers are included in the computation, noise may be contained. So, it is preferable that X2 is the mean value of the powers of the predetermined wave number a to 100 m$^{-1}$, and it is more preferable that X2 is the mean value of the powers of the predetermined wave number a to 40 m$^{-1}$.

It is preferable that the predetermined number a is equal to 1/(an interval between respectively adjacent thickness adjusting means x the stretching ratio of the sheet in the transverse direction). The thickness irregularity of wave numbers of larger than it little affects the winding appearance of the roll and the control by the thickness adjusting means becomes difficult.

If the film is oscillated when wound, the influence of thickness irregularity can be further decreased. The oscillation means to reciprocate the roll as a wound film in the transverse direction of the roll when the film is wound. If the film is oscillated especially in an amplitude range of $0.5 \times (1/\text{wave number a}) \leq (\text{Oscillation amplitude}) \leq 5 \times (1/\text{wave number a})$, when wound, the thickness irregularity of high wave numbers little affects the winding appearance.

If the sheet production process of the invention using the above-mentioned control action computation is used, the sheet thickness can be controlled to have a desired thickness profile quickly at high accuracy. Thus, the low frequency component in the thickness irregularity of the sheet can be efficiently removed.

The respective actions of the control means in the above embodiments can be realized by means of a computer, a program for causing those actions, etc. The program and the data of various storing means can be distributed by tangible media available for computer reading such as floppy disc, MO and CD-ROM and transmission means such as wired or wireless network.

Examples in which the invention is used to produce sheets are described below.

EXAMPLE 1

The sheet production equipment shown in FIG. 2 was used to produce a 2.7 $\mu$m thick polyester film. The width of the produced film was 3.5 m, and the film forming speed in the product portion was 175 m/min. Each of the thickness adjusting means 10 was a heat bolt containing a cartridge heater for thermally expanding and contracting the bolt, thereby adjusting the gap 11. The number of heat bolts used for thickness control was 45. The thickness gauge 8 used was a light interference type thickness gauge using the interference phenomenon of light described in JP, 4-522, B. The thickness gauge can measure the film thickness at 15 mm intervals in the transverse direction of the film while scanning at cycles of 60 seconds in the transverse direction of the film. The control interval were 60 seconds equal to the scanning cycles of the thickness gauge.

The process model of formula 1 was decided as shown by the following formula, based on the sheet thickness changes near the measuring position corresponding to one heat bolt to which a predetermined manipulated variable was applied In this example, a manipulated variable refers to the rate of time during which a heat quantity is applied to each heat bolt.

Equation 35:

$$\begin{bmatrix} y_1 \\ y_2 \\ y_3 \\ \vdots \\ \vdots \\ \vdots \\ \vdots \\ y_{n-2} \\ y_{n-1} \\ y_n \end{bmatrix} = \frac{-0.315 z^{-2} - 0.012 z^{-1} + 1.57}{0.012 z^{-3} + 0.54 z^{-2} - 0.714 z^{-1}} \begin{bmatrix} 0.65 & 1 & 0.65 & 0.25 & 0 & 0 & 0 & 0 & 0 & 0 & 0 & 0 \\ 0.25 & 0.65 & 1 & 0.65 & 0.25 & 0 & 0 & 0 & 0 & 0 & 0 & 0 \\ 0 & 0.25 & 0.65 & 1 & 0.65 & 0.25 & 0 & 0 & 0 & 0 & 0 & 0 \\ 0 & 0 & 0.25 & 0.65 & 1 & 0.65 & 0.25 & 0 & 0 & 0 & 0 & 0 \\ 0 & 0 & 0 & 0.25 & 0.65 & 1 & 0.65 & 0.25 & 0 & 0 & 0 & 0 \\ 0 & 0 & 0 & 0 & 0.25 & 0.65 & 1 & 0.65 & 0.25 & 0 & 0 & 0 \\ 0 & 0 & 0 & 0 & 0 & 0.25 & 0.65 & 1 & 0.65 & 0.25 & 0 & 0 \\ 0 & 0 & 0 & 0 & 0 & 0 & 0.25 & 0.65 & 1 & 0.65 & 0.25 & 0 \\ 0 & 0 & 0 & 0 & 0 & 0 & 0 & 0.25 & 0.65 & 1 & 0.65 & 0.25 \\ 0 & 0 & 0 & 0 & 0 & 0 & 0 & 0 & 0.25 & 0.65 & 1 & 0.65 \end{bmatrix} \begin{bmatrix} u_1 \\ u_2 \\ u_3 \\ \vdots \\ \vdots \\ \vdots \\ \vdots \\ u_{m-2} \\ u_{m-1} \\ u_m \end{bmatrix}$$

Furthermore, the L, P and m of formula 10 were 0, 10 and 7 respectively, and coefficients $\lambda_i$ (i=1, 2, ..., P) and $\Psi_i$ (i=1, 2, ..., m) of the evaluation function J were set at 1.0 and 0.8 respectively.

At first, manipulated variables were applied to plural heat bolts to intentionally make thickness irregularity (obtained by dividing the difference between the maximum value and the minimum value of thickness by a mean thickness value), and the thickness of the film was controlled according to the method of the invention.

Furthermore, for comparison, thickness irregularity of a similar same degree was made, and the thickness of the film was controlled according to conventional control (PID control).

Figure 16:
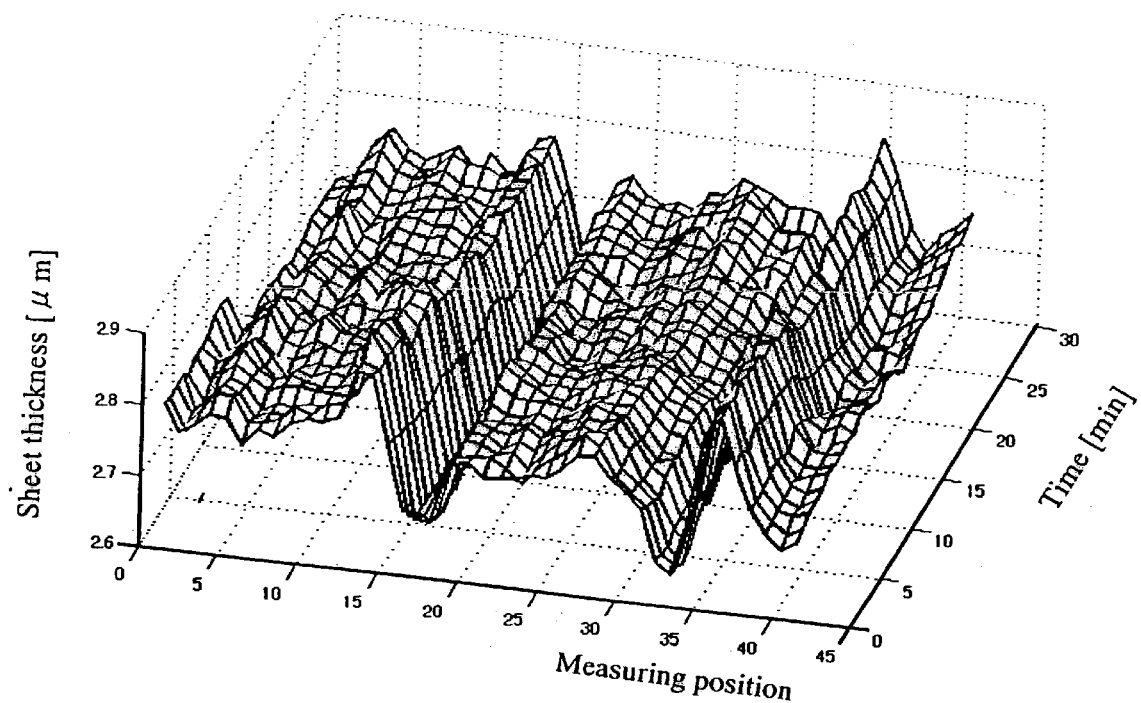
FIG. 16 shows a result of sheet thickness control in the sheet production in a conventional process.
Figure 17:
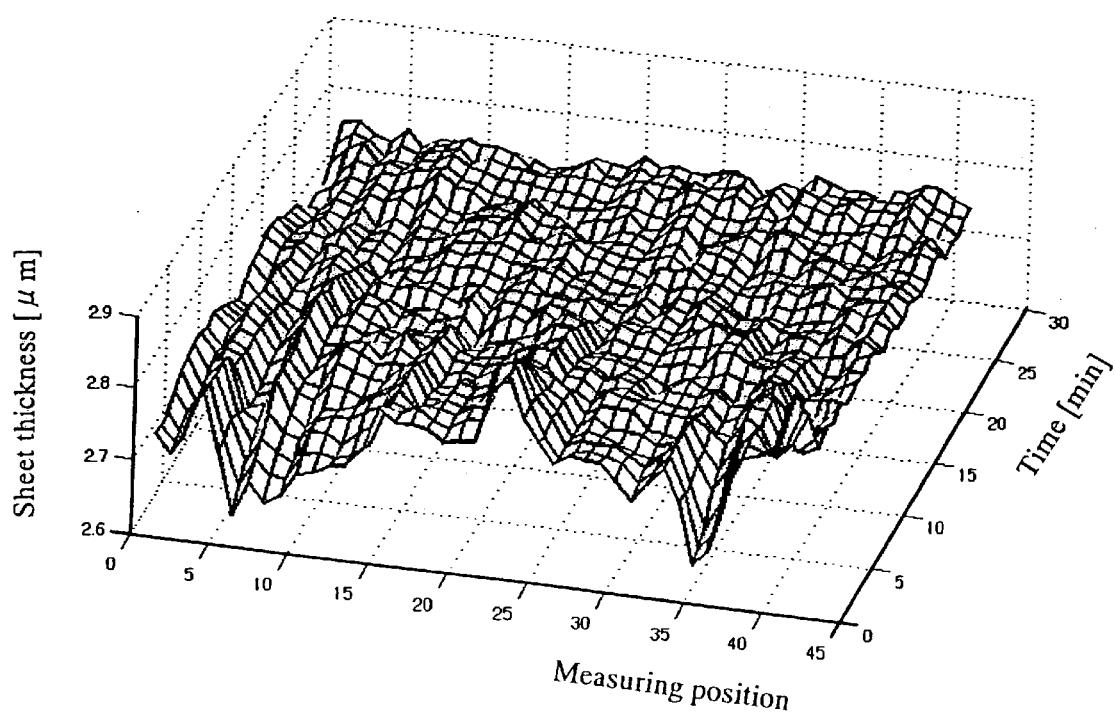
FIG. 17 shows a result of thickness control in the sheet production in an example of the invention.

FIG. 16 shows the control result of PID control, and FIG. 17, the control result of the method of the invention. In FIG. 16, in control of about 30 minutes, the thickness irregularity was improved from 8.4% to only 7.4%, but in FIG. 17, similarly in control of about 30 minutes, the thickness irregularity was improved from 9.1% to 1.4%. It could be confirmed that when the method of the invention was used, the sheet thickness could be controlled to have a desired profile quickly at good accuracy.

EXAMPLE 2

Thickness irregularity of a similar degree to that of Example 1 was made. Immediately after start of control when the thickness irregularity was still high, coefficients $\lambda_i$ (i=1, 2, ..., P) and $\Psi_i$ (i=1, 2, ..., m) of the evaluation function J were set at 1.0 and 0.5 respectively to keep the contribution of $\Psi$ relating to the manipulated variables small, for applying large manipulated variables, and when the thickness irregularity became 5%, the respective coefficients were changed to 1.0 and 0.8 respectively. As a result, the thickness irregularity could be improved faster than in Example 1.

EXAMPLE 3

The range of respectively 35% on both sides of a center in the transverse direction of a film was defined as the central portion, and the remaining ranges of 15% each on both sides, as the edge portions. Predetermined manipulated variables were applied to respectively optional heat bolts in the central portion and the edge portions. When the sheet thickness values near the sheet thickness measuring positions corresponding to the respective heat bolts became stable, the sheet thickness distribution was referred to for deciding the $\alpha_1$ and $\alpha_2$ as $\alpha_1$=0.6 and $\alpha_2$=0.2 in the central portion and $\alpha_1$=0.7 and $\alpha_2$=0.3 in the edge portions. Thickness irregularity of a similar degree to those of Examples 1 and 2 was made in the entire width of the sheet, and the method of the invention was applied to control the film thickness. As a result, the thickness became more uniform over the entire width of the film than in Examples 1 and 2, and the film could be formed stably.

EXAMPLE 4

The sheet production equipment shown in FIG. 2 described above was used to produce a 2.7 $\mu$m thick polyester film. Each of the thickness adjusting means 10 was a heat bolt containing a cartridge heater for thermally expanding and contracting the bolt, thereby adjusting the gap 11. The number of heat bolts used for thickness control was 45, and the respective bolts were arranged at a pitch of 20 mm. The thickness gauge 8 used was a light interference type thickness gauge using the interference phenomenon of light. The width of the produced film was 3.5 m, and the film forming speed in the product portion was 175 m/min.

In this example, to make a process model at first according to the control means design flow of FIG. 5, the manipulated variables of optional heat bolts were changed step-wise to measure the changes of thickness, as step response test. The step response test was carried out in the edge portions and the central portions to measure the changes of thickness. As a result, it was found that:

(1) The process gains were smaller in the edge portions than in the central portion.
(2) The interference rates were different in the edge portions and the central portion.
(3) It was suitable that the central portion accounted for 70% of the entire width while the edge portions accounted for 15% each.

The measured values were as shown in Table 1.

TABLE 1

|  | Central portion | Edge portions |
|---|---|---|
| Process gain | 0.05 μm/% | 0.03 μm/% |
| Interference rate |  |  |
| Controlled position | 1.0 | 1.0 |
| First adjacent positions | 0.6 | 0.7 |
| Second adjacent positions | 0.2 | 0.3 |
| Delay time Td |  | 80 sec |
| Time constant T |  | 160 sec |

In the above, a process gain refers to the rate of the sheet thickness changes to the manipulated variable changes applied to a heat bolt. The manipulated variable of a heat bolt is the percentage of the time during which a certain electric power is supplied to the heat bolt, to a certain period time (10 seconds). Therefore, the unit of a process gain is μm/%.

An interference rate expresses the change of the sheet thickness at the positions correspond to a certain operated heat bolt, and a first adjacent position or second adjacent position is of the bolt caused when said heat bolt is operated, with the change at the position correspond to the operated heat bolt as 1.

Based on the results of the step response test, in this example, a process model different in two process parameters of process gain and interference rate between the edge portions and the central portion was prepared.

That is, the static mathematical relation between the thickness change Yi at the position corresponding to each heat bolt and the manipulated variable change Ui applied to the heat bolt in the central portion is expressed by the following formula $$Yi=0.05\ddagger(0.2Ui-2+0.6Ui-1+Ui+0.6Ui+1+0.2Ui+2) \quad (1)$$

and that in the edge portions, by the-following formula $$Yi=0.03\ddagger(0.3Ui-2+0.7Ui-1+Ui+0.7Ui+1+0.3Ui+2) \quad (2)$$

where

Ui: Manipulated variable change of i-th position heat bolt [%]
Yi: Thickness change at the corresponding position [μm]

Furthermore, it was assumed that time constant T and dead time Td existed as dynamic characteristics of the process model. The time constant T and the delay time Td were identified from the step response test. In this example, as shown in Table 1, equal values were obtained for the edge portions and the central portion.

Figure 18:
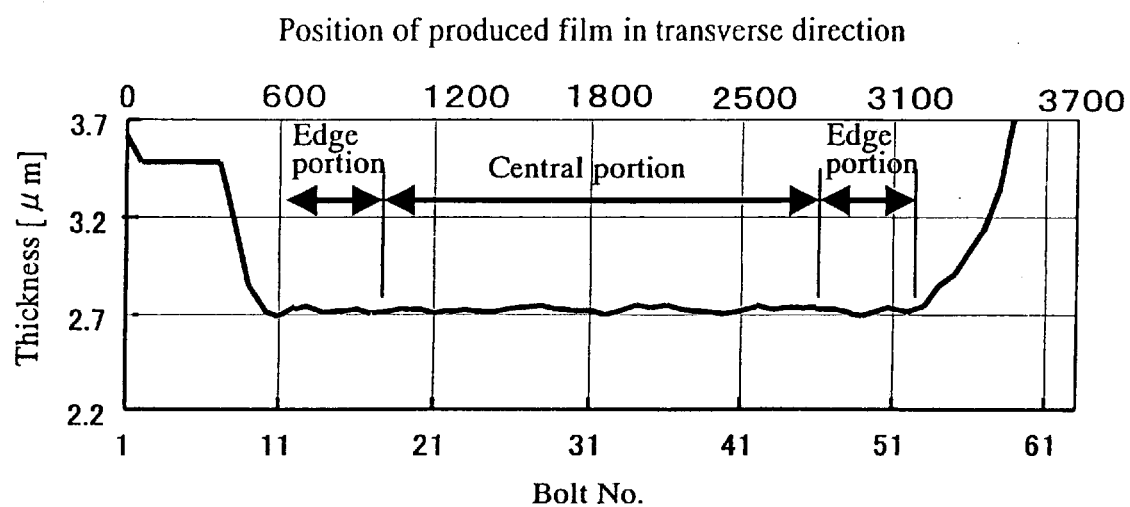
FIG. 18 is a diagram showing a film thickness distribution in the case where the film thickness is controlled using the process of the invention.

FIG. 18 shows the control result of sheet thickness obtained when the thickness of the plastic film produced using the controller decided based on the process model described above was stabilized after lapse of sufficient time. The control range was from No. 11 bolt to No. 52 bolt (corresponding to the positions of 600 mm and 310 mm from the edges of the produced film), and the central portion ranged from No. 18 bolt to No. 45 bolt. As shown in the diagram, the thickness became uniform over the entire width, and the film could be formed stably.

Figure 19:
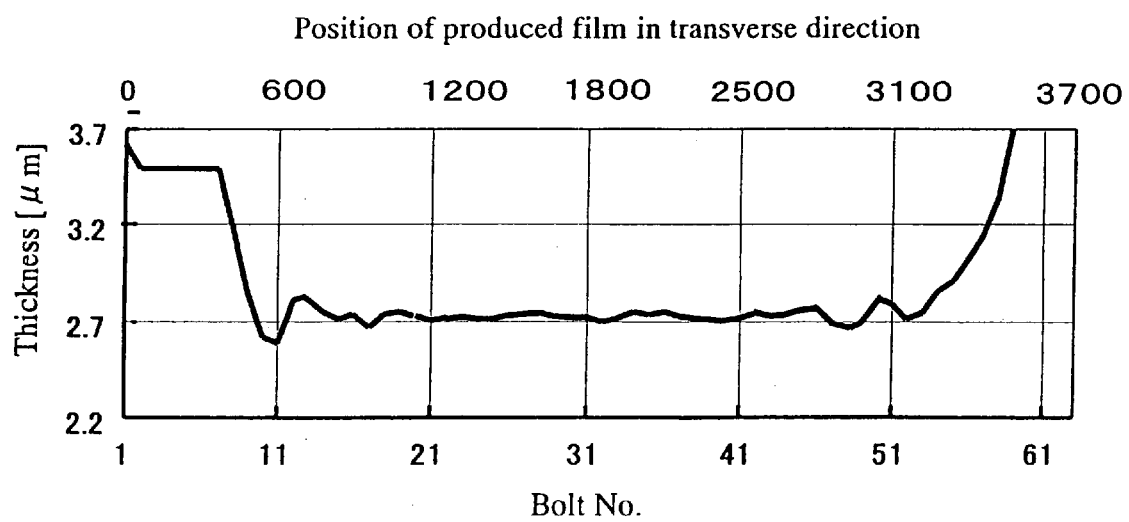
FIG. 19 is a diagram showing a film thickness distribution in the case where the film thickness is controlled using a conventional process.

On the other hand, FIG. 19 shows the control result of sheet thickness obtained when the plastic film was produced using the controller decided based on a process model having $$Yi=0.05\ddagger(0.2Ui-2+0.6Ui-1+Ui+0.6Ui+1+0.2Ui+2) \quad (3)$$

in the entire width. While the actual process gains in the edge portions were small, the gains of the control system were adapted to the central portion. So, the entire gain became insufficient, and the thickness control stability was poor. Even after lapse of sufficient time, thickness irregularity remained.

EXAMPLE 5

An example in which the invention was used to produce a plastic film is described below.

The production equipment shown in FIGS. 2 and 3 with a die 4 having 40 heat bolts used as the thickness adjusting means 10 was used to produce a plastic film.

A manipulated variable in this example refers to the rate of time during which a heat quantity is applied to a heat bolt, per predetermined period of time.

For components of the interference matrix of formula 20, the film production process was analyzed to set $\alpha_1=0.75$ and $\alpha_2=0.35$.

Figure 9:
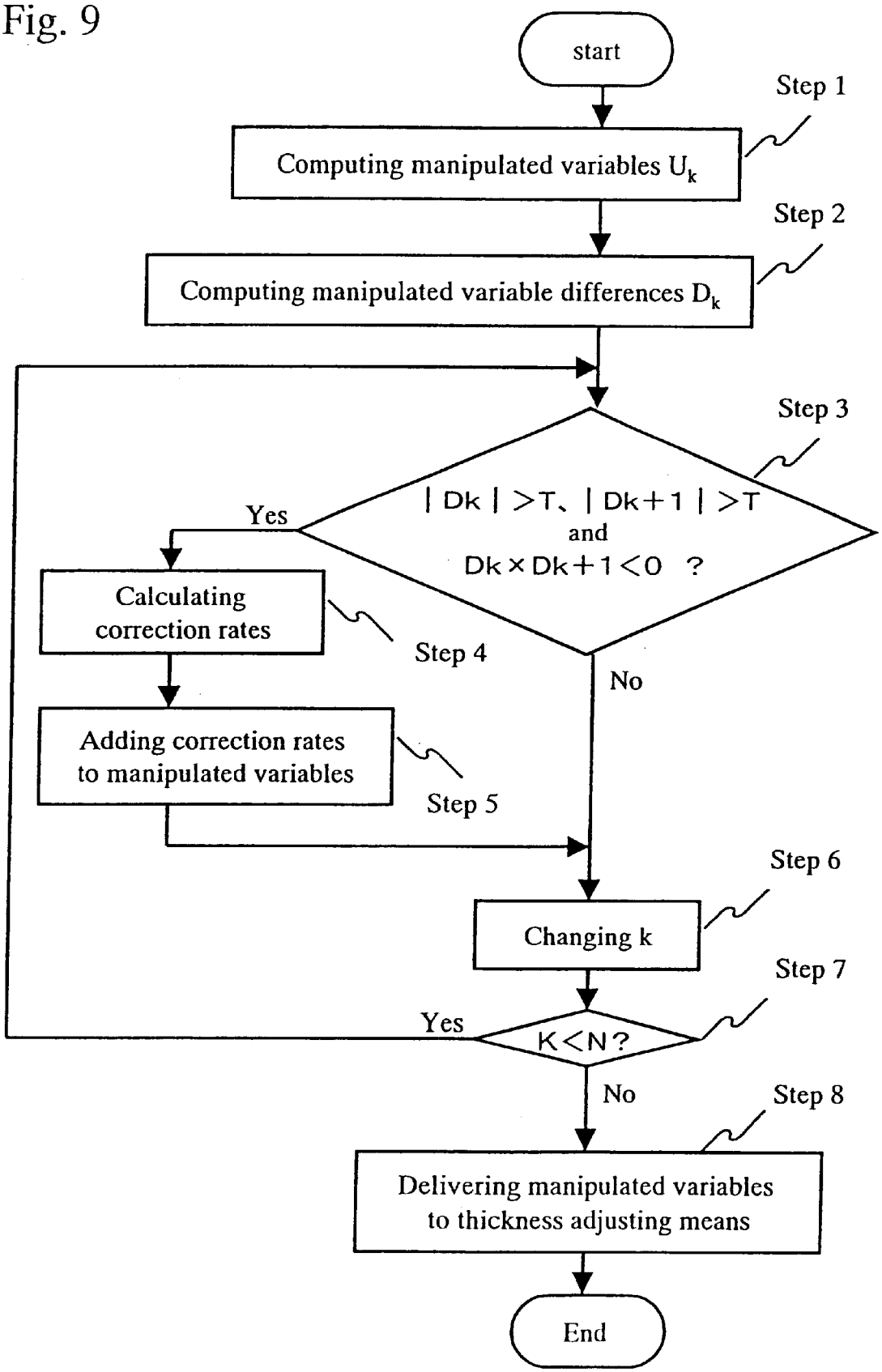
FIG. 9 is a flowchart for leveling the manipulation variables in an embodiment of the invention.

The leveling was carried out automatically as shown in FIG. 9. The threshold value T in step 3 of FIG. 9 was set at 15%, and the correction rate a was set at −5%. The thickness adjusting means corrected at a time were one thickness adjusting means greatly different in the manipulated variable from both the adjacent thickness adjusting means, and the respectively two adjacent thickness adjusting means on both sides of it, five thickness adjusting means in total.

With $\epsilon_i$=(i=1, 2, . . . , 5) in formula 21, a pseudo-inverse matrix was used for leveling as shown in formulae 22 through 24.

$D_i$ was obtained for each manipulated variable, and when it satisfied $|D_i|>T=15$, $|D_{i-1}|>T=15$ and $D_i \times D_{i-1}<0$, the correction rate of the manipulated variable was obtained according to formula 22.

Figure 20:
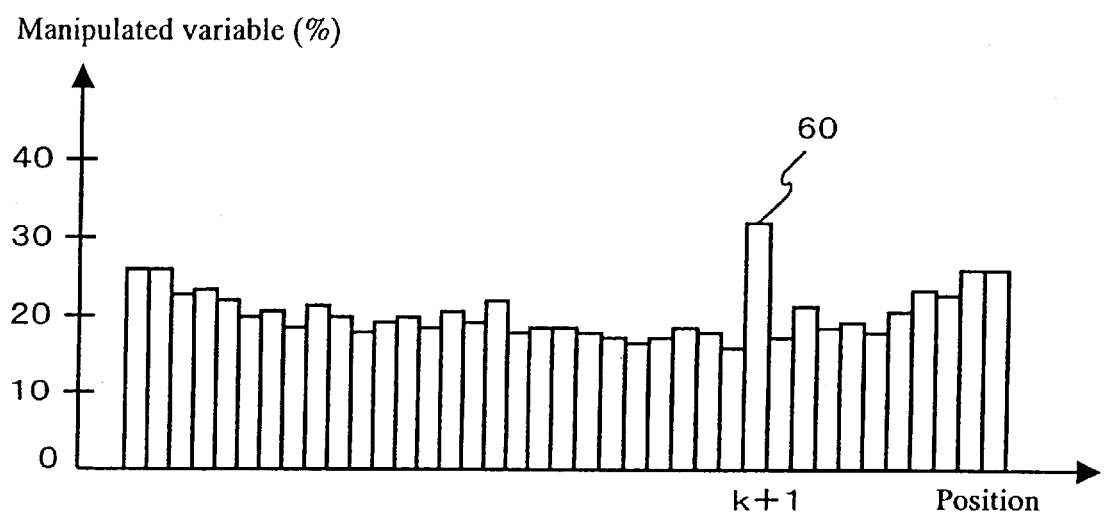
FIG. 20 is a diagram showing a pattern of manipulated variables in an embodiment of the invention.
Figure 21:
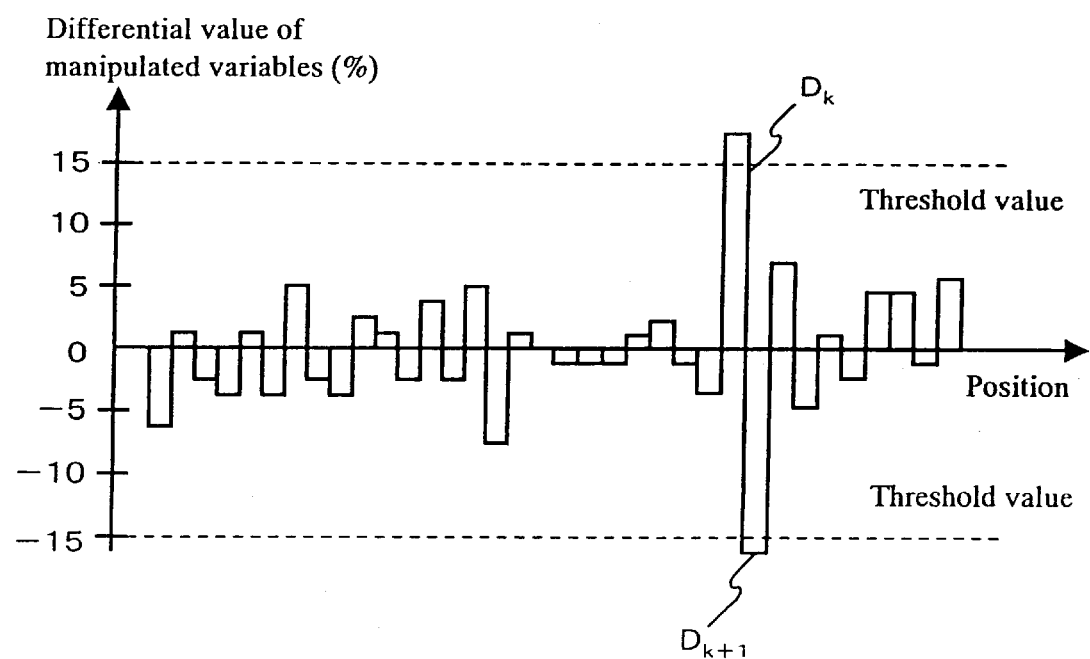
FIG. 21 is a diagram showing a pattern of differential values of the respectively adjacent manipulated variables in FIG. 20.

The pattern of manipulated variables at a certain time point during the sheet thickness control was as shown in FIG. 20, and the pattern of the differential values between the manipulated variables delivered to adjacent thickness adjusting means was as shown in FIG. 21. In FIGS. 20 and 21, the magnitude of the manipulated variable is chosen as the ordinate of this graph, and it expresses the rate of the time during which a certain heat quantity is delivered to a heat bolt, per predetermined period of time. The value of the manipulated variable at position i+1 projects by about 20% compared with the values of both the adjacent positions. In FIG. 21, $|D_i|$ and $|D_{i+1}|$ are larger than the threshold value and different in sign. So the manipulated variable 40 (=$u_{i+1}$) was leveled. As a result, in formula 22, the correction rates $b_i$ became $b_1=b_4=-1.0\%$ and $b_2=b_3=3.0\%$ respectively.

The calculated correction rates were added to the manipulated variables, and the sums were delivered to the thickness adjusting means.

Figure 22:
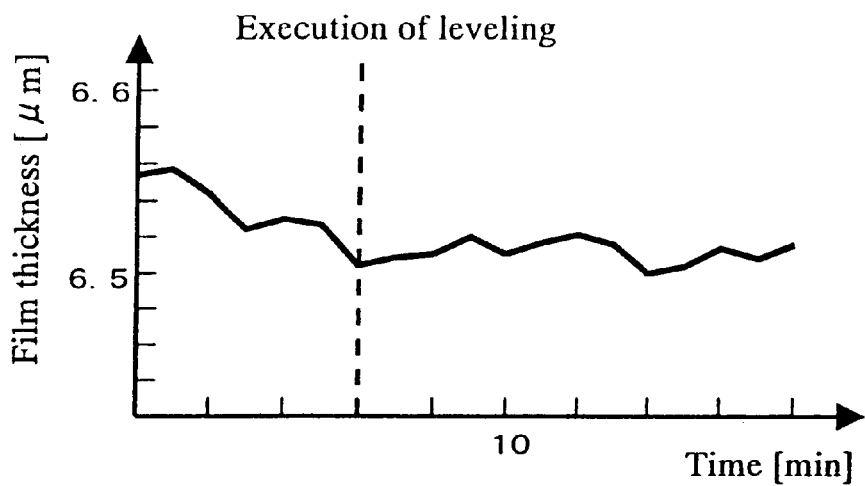
FIG. 22 is a graph showing a result of thickness control used in a production of sheet in an embodiment of the invention.

FIG. 22 shows the change with the lapse of time, of the measured thickness value corresponding to the thickness adjusting means at position i+1 that received the manipulated variable 60. The sheet thickness little changed with the lapse of time.

Figure 23:
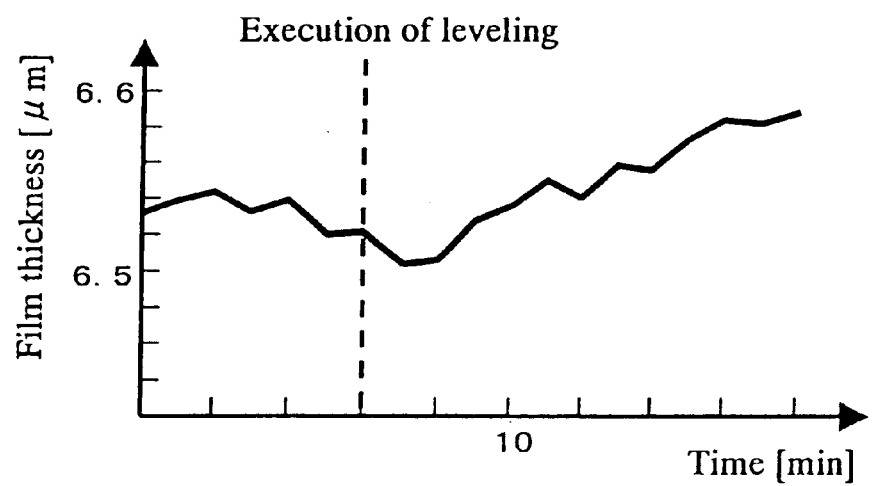
FIG. 23 is a graph showing a result of thickness control used in a production of sheet in the case where manipulated variables are leveled by a conventional method.

For comparison, the manipulated variables were corrected to reduce the differences between the manipulated variable 60 and the manipulated variables of both the adjacent positions to 10% or less in the pattern of manipulated variables as shown in FIG. using the method described in JP, 7-329147, A Gazette. The change of the sheet thickness with the lapse of time in this case is shown in FIG. 23. The sheet thickness changed greatly to impair the quality of the sheet.

EXAMPLE 6

An example in which the invention was used to produce a plastic film is described below.

The production equipment shown in FIGS. 2 and 3 with a die 4 having 38 heat bolts used as the thickness adjusting means 10 was used to produce a plastic film.

A manipulated variable in this example refers to the rate of the time during which a heat quantity was applied to a heat bolt, per predetermined period of time.

For components of the interference matrix of formula 28, the film production process was analyzed to set $\beta_1=0.75$ and $\beta_2=0.35$.

It was decided to carry out the leveling of manipulated variables when the standard deviation of the manipulated variables delivered to the 38 thickness adjusting means was 3% or more. With M=38 and $T_1=0.05$ in formula 1, the manipulated variables of all the 38 thickness adjusting means were leveled to be corrected.

Figure 24:
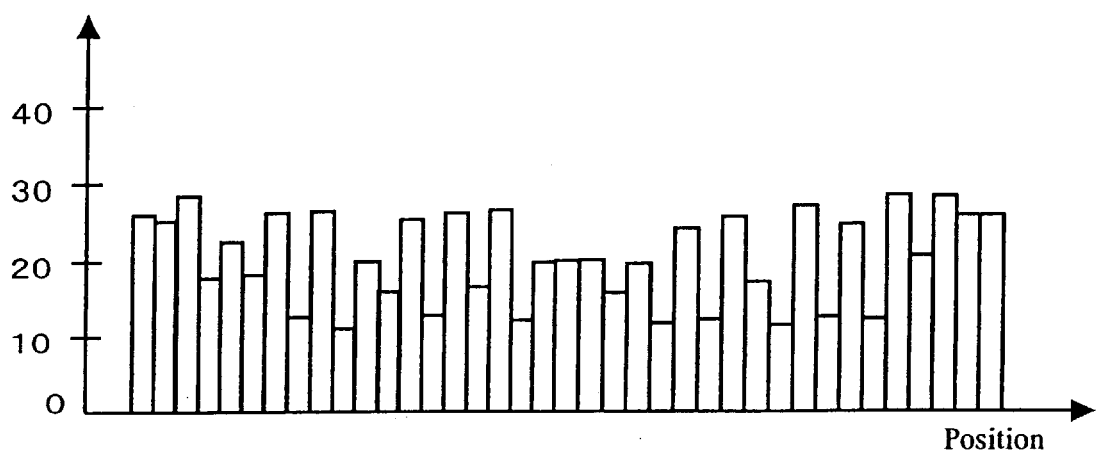
FIG. 24 is a diagram showing a pattern of manipulated variables in an embodiment of the invention.
Figure 25:
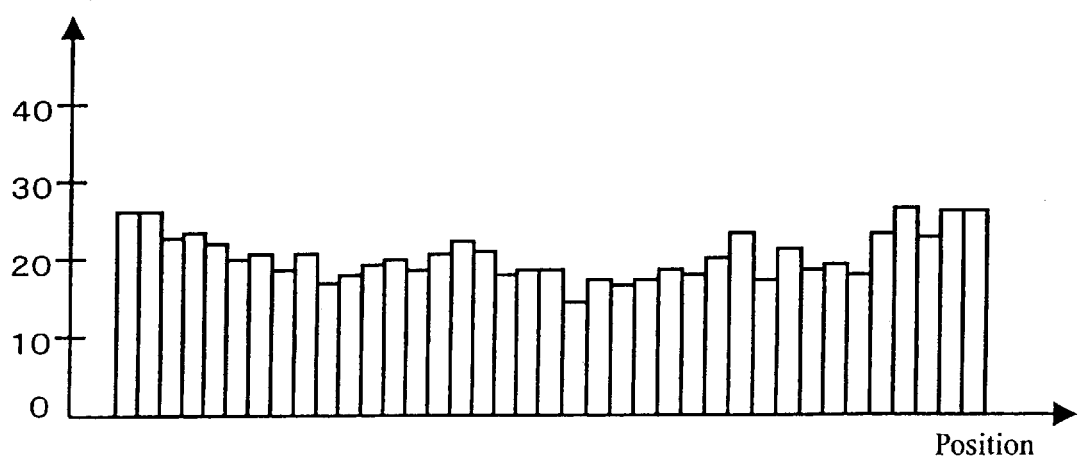
FIG. 25 is a diagram showing a manipulation result in an embodiment of the invention.
Figure 26:
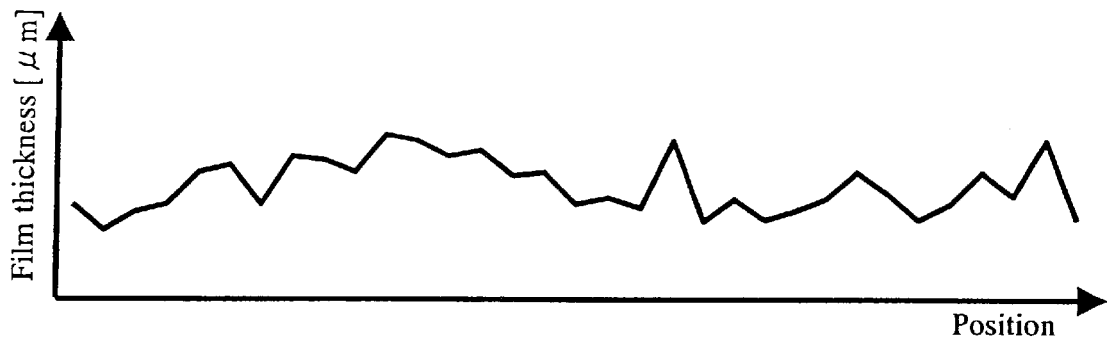
FIG. 26 shows the sheet thickness pattern corresponding to positions shown in FIG. 6.
Figure 27:
FIG. 27 shows the sheet thickness pattern corresponding to positions shown in FIG. 7.

The pattern of manipulated variables at a certain time point during the sheet thickness control became as shown in FIG. 24. The magnitude of the manipulated variable is chosen as the ordinate of this graph, and it expresses the rate of the time during which a certain heat quantity was delivered to a heat bolt, per predetermined period of time. Since the standard deviation of the manipulated variables at this moment was 3.5%, the manipulated variables were leveled. FIG. 25 shows the leveled manipulated variable pattern applied to the thickness adjusting means. As a result, the standard deviation of manipulated variables became 2.3%. So, the leveling could make the standard deviation of manipulated variables smaller. FIG. 26 shows the sheet thickness distribution before leveling, and FIG. 27, the sheet thickness distribution after leveling. The thickness distribution after leveling was little different from that before leveling.

Figure 28:
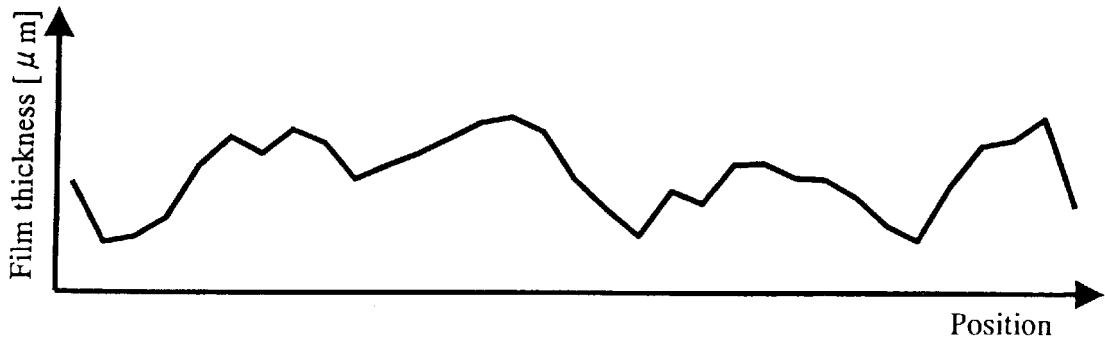
FIG. 28 is a graph showing a result of thickness control in sheet production in the case where manipulated variables are leveled by a conventional method.

For comparison, manipulated variables were corrected sequentially in the descending order of the magnitude of the difference between the manipulated variables of respectively adjacent thickness adjusting means, in order to become the difference between the manipulated variables at both the adjacent positions 7% or less in the pattern of manipulated variables as shown in FIG. 24 using the method described in JP07329147A. The sheet thickness distribution obtained when the standard deviation of manipulated variables became 2.3% is shown in FIG. 28. The sheet thickness distribution greatly changed.

EXAMPLE 7

An example in which the invention was used to produce a plastic film is described below.

Figure 29:
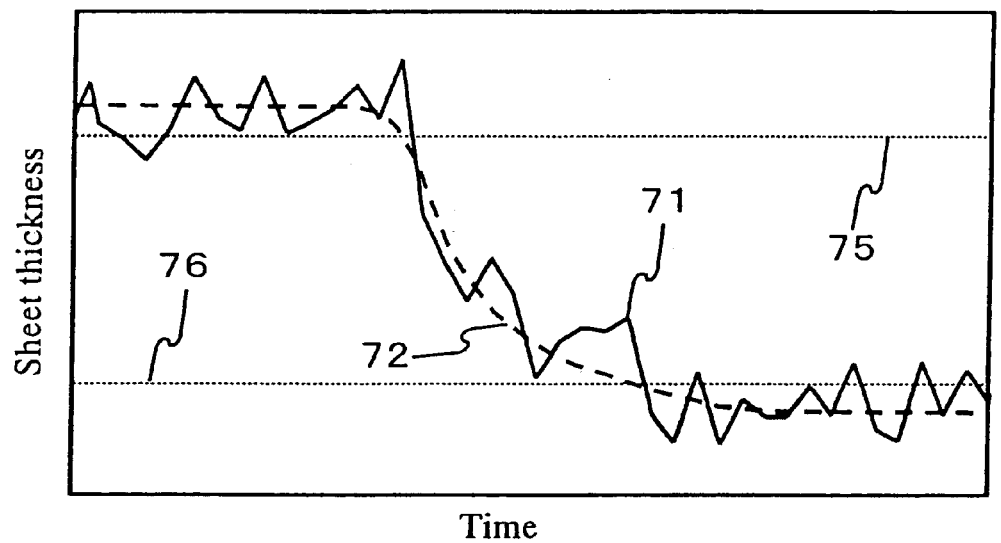
FIG. 29 is a diagram showing the change of film thickness with the lapse of time in the case where heat bolts are heated in an embodiment of the invention.
Figure 30:
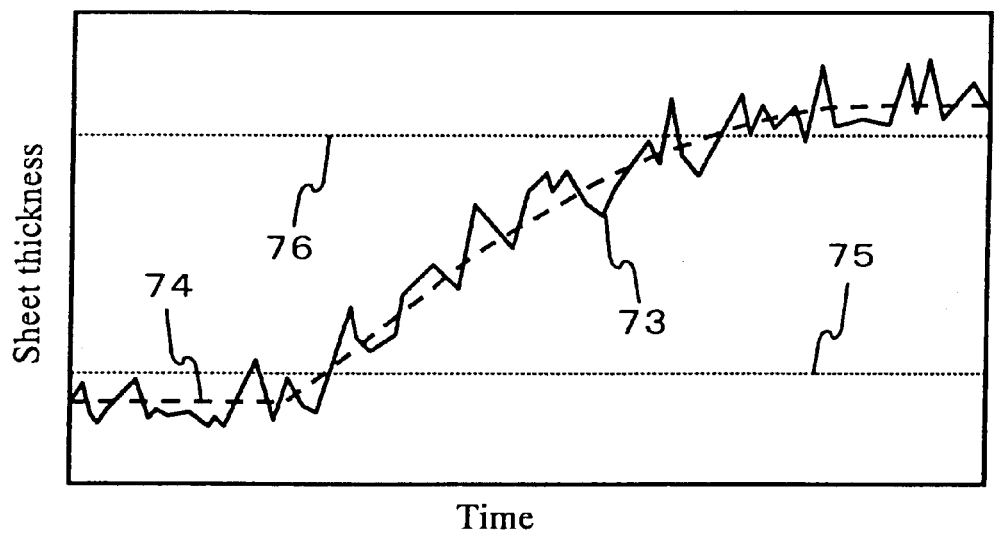
FIG. 30 is a diagram showing the change of film thickness with the lapse of time in the case where heat bolts are cooled in the example shown in FIG. 29.
Figure 31:
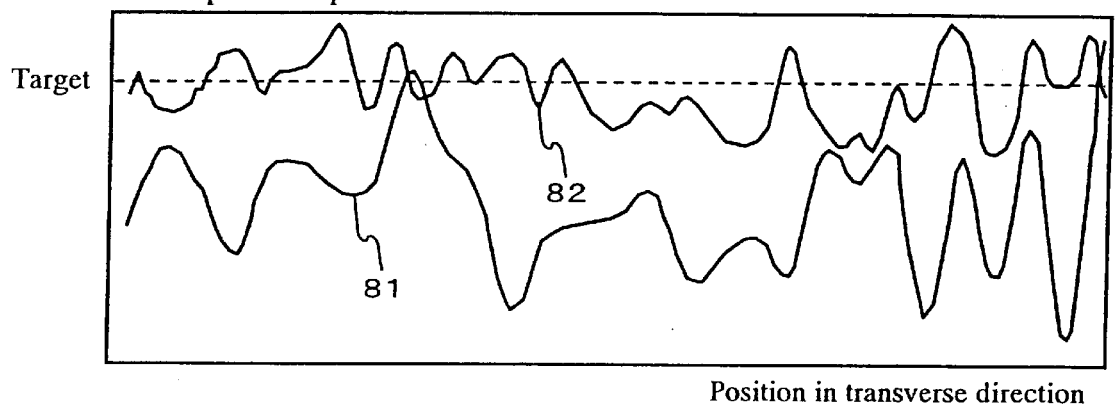
FIG. 31 is a graph showing an outer diameter profile of a produced roll in the examples shown in FIGS. 29 and 30.

In a film production process using heat bolts, certain heat quantities were applied to plural bolts, to push or pull the bolts. The mean values 71 and 73 in the change of film thickness with the lapse of time in this case are shown in FIGS. 29 and 30. In the diagrams, broken lines 72 and 74 are obtained by functionally approximating 71 and 73. Comparing the time taken for the approximation curve 72 to change from 10% of the entire variation to 90% (dotted lines 75 and 76 in FIG. 29) with that for the approximation curve 76 to change similarly (dotted lines 75 and 76 in FIG. 30), the time in the case of heating (pushing) (72) is shorter than that in the case of cooling (pulling) (74) by a factor of about 1.4. FIG. 31 shows the outer diameter profile 81 of the roll produced in this case. Since the pulling action was slow and insufficient, the outer diameter profile was generally thinner than the desired value.

So the variation of a heat quantity was increased to 1.4 times in the case of cooling, to produce a film as described above. FIG. 31 shows the outer diameter profile 82 of the roll produced in this case. When larger heat quantities were applied in the case of cooling bolts, the responsiveness during cooling improved, and the irregularity of the outer diameter profile of the produced roll generally decreased.

In the case where the measured values are smaller than the desired value with heat bolts used, the corresponding heat bolts are cooled. In such a case, if the differences between measured values and the desired value are increased to 1.4 times, to obtain heat quantities, the irregularity of the outer diameter profile of the roll generally decrease as in this example.

EXAMPLE 8

An example in which the invention was used to produce a plastic film is described below.

The sheet production equipment shown in FIG. 2 as described above was used to produce a 2.7 µm thick polyester film. As the thickness adjusting means 10, heat bolts each containing a cartridge heater for thermally expanded and contracted to adjust the gap 11 were used. The number of the heat bolts used for thickness control was 45, and the bolts were arranged at a pitch of 20 mm. The sheet width of the product portion was 3.5 m, and the stretching ratio in the transverse direction of the sheet was 3.5 times.

For computation control of manipulated variables, a step of measuring the thickness distribution of the sheet in the transverse direction, a step of deriving manipulated variable time series in which a predetermined evaluation function for evaluating the future sheet thickness changes predicted based on said measured values and on a process model expressing the relation between said manipulated variables and sheet thickness values becomes a minimum value, and a step of delivering at least the first manipulated variables of said manipulated variable time series to said thickness adjusting means were repeated at predetermined intervals.

Figure 32:
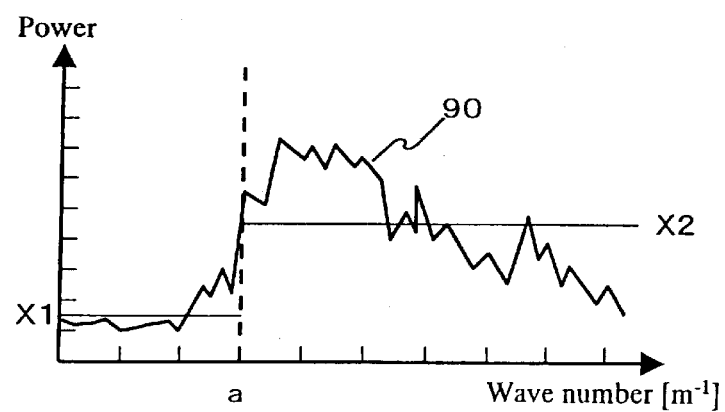
FIG. 32 is a diagram showing the power spectrum of the sheet thickness profile in the transverse direction in an embodiment of the invention.

The wound roll was divided into three rolls, and from the respective surface layers of the rolls, 10 sheets each were cut out, and the thickness of the sheets were measured by a contact film thickness gauge at 0.5 mm intervals. The power spectrum 90 was as shown in FIG. 32.

With wave number a at 1/(an interval between thickness adjusting means x stretching ratio of the sheet in the transverse direction)=0.014, the mean value X1 of the powers of smaller than wave number a and the mean value X2 of the powers of wave number a and larger were found to be X1=25 and X2=120. X1 was sufficiently small compared with X2. The roll form of the roll of the film was good.

In the above examples, heat bolts were used as the thickness adjusting means, but the thickness adjusting means are not especially limited if they suit the objects of the invention. For example, actuators such as servomotors or pneumatic motors and die bolts can also be used. The elements for changing the manipulated variables of thickness adjusting means can be other than energizing times and voltages, such as the rotating angles of die bolts and heater temperatures.

INDUSTRIAL APPLICABILITY

As described above, since the method of manufacturing sheet of the invention can control the sheet thickness to have a desired thickness profile at high speed, the time taken after starting the production of the sheet till a predetermined thickness irregularity level acceptable as a product is reached can be shortened to remarkably reduce the quantity of non-conforming products produced in this duration and to enhance the production efficiency, thus allowing the sheet cost to be reduced. Furthermore, even if the thickness profile of the sheet changes, for example, since the temperature distribution of the stretching machine changes during film formation, it can be controlled to have a desired profile quickly. So, as a result, the thickness uniformity of the sheet can be improved to improve the quality of the sheet.

What is claimed is:

1. A method of manufacturing a sheet, in which a raw material is extruded and molded into a sheet using a die with plural thickness adjusting means and the thickness of said sheet is controlled by controlling the manipulated variables applied to said thickness adjusting means, characterized by repeating, at predetermined intervals, a step of measuring the thickness distribution of the sheet in the transverse direction, a step of deriving manipulated variable time series in which a predetermined evaluation function for evaluating the future sheet thickness changes predicted based on said measured values and on a process model expressing the relation between said manipulated variables and sheet thickness values becomes a minimum value, and a step of delivering at least the first manipulated variables of the derived manipulated variable time series to said thickness adjusting means.

2. A method of manufacturing a sheet according to claim 1, wherein said predetermined evaluation function is based on said sheet thickness changes and said changes of manipulated variables.

3. A method of manufacturing-a sheet according to claim 2, wherein as said predetermined evaluation function, different evaluation functions are used, in the beginning of production and during stable production, to ensure that the contribution of sheet thickness changes becomes higher relatively to the contribution of manipulated variables in the beginning of production than during stable production.

4. A method of manufacturing a sheet according to claim 1, wherein said process model used is expressed by a product obtained by multiplying a transfer function and a constant matrix in which at least the diagonal component is not zero.

5. A method of manufacturing a sheet according to claim 4, wherein constants respectively different in the portions corresponding to the edge portions and the central portion of the sheet in the transverse direction are used as said constant matrix.

6. A method of manufacturing a sheet according to claim 1, wherein the number of the thickness adjusting means is N (N: a natural number of 2 or more); the manipulated variable delivered to the i-th (i=1, 2, . . . , N) thickness adjusting means is corrected to lessen the differences between the derived manipulated variable of the i-th thickness adjusting means and the manipulated variables delivered to the thickness adjusting means near the i-th thickness adjusting means in the case where the said differences are not less than a predetermined value, T, while the manipulated variables delivered to said near thickness adjusting means are corrected based on a static process model expressing the static relation between the manipulated variables to be delivered and the sheet thickness values, to be obtained by them after lapse of a sufficient time; and the respectively corrected manipulated variables are delivered to said respective thickness adjusting means.

7. A method of manufacturing a sheet according to claim 6, wherein when the correction rate of the manipulated variable to be delivered to said i-th thickness adjusting means is a, the correction rates $b_j$ (j=−M1, −M1+1, . . . , −1, 1, . . . , M2−1, M2) of the manipulated variables to be delivered to the M1 and M2 (M1, M2: natural numbers) thickness adjusting means respectively adjacent to said i-th thickness adjusting means on both sides are derived using the following formula:

$$\begin{bmatrix} \varepsilon_{-M1} \\ \varepsilon_{-M1+1} \\ \vdots \\ \varepsilon_{M2-1} \\ \varepsilon_{M2} \end{bmatrix} = A' \begin{bmatrix} b_{-M1} \\ b_{-M1+1} \\ \vdots \\ b_{-1} \\ a \\ b_1 \\ \vdots \\ b_{M2-1} \\ b_{M2} \end{bmatrix}$$

where if A' is a matrix with a size of (M1+M2+1)×(M1+M2+1) obtained by extracting the portions corresponding to the i-th thickness adjusting means and the (M1+M2) thickness adjusting means respectively consecutively positioned adjacent to the i-th thickness adjusting means on both sides, from a matrix with a size of N×N ,in case that the static process model is presented, as Y=AU, where U is the vector of the manipulated variables ($u_1, u_2, \ldots, u_N$) delivered to N thickness adjusting means while Y is the vector of the N sheet thickness values ($y_1, y_2, \ldots, y_N$) corresponding to the respective thickness adjusting means; and $\epsilon_i$ (i=−M1, −M1*1, . . . , M2−, M2) is 0 or a finite value.

8. A method of manufacturing a sheet according to claim 1, wherein the number of thickness adjusting means is N (N: a natural number of 2 or more), and the manipulated variables to be delivered to consecutive M (M: a natural number of 2 to N) thickness adjusting means are corrected based on a static process model expressing the static relation between the manipulated variables to be delivered and the sheet thickness values at the position corresponding to the respective thickness adjusting means, to be obtained by them after lapse of a sufficient time, to lessen the dispersion of the manipulated variables delivered to said consecutive M thickness adjusting means among the manipulated variables of said N thickness adjusting means.

9. A method of manufacturing a sheet according to claim 8, wherein if the manipulated variables $(u'_1, u'_2, \ldots, u'_M)^T$ delivered to said consecutive M thickness adjusting means are vector U', the M sheet thickness values $(y'_1, y'_2, \ldots, y'_M)^T$ corresponding to the respective thickness adjusting means are vector Y', and said process model is expressed by Y'=A'U' (A' is a matrix with a size of M×M), then the corrected manipulated variable vector $U''=(u_1'', u_2'', \ldots, u_M'')$ are derived from the following formula, using the coefficients $a_i$ (i=1, 2, . . . , M) of M eigenvectors $v_i$ (i=1, 2, . . . , M) of matrix A' obtained by resolving the manipulated variable vector U' before correction by said eigenvectors, the eigenvalues $\lambda_i$ (i=1, 2, . . . , M) corresponding to said eigenvectors, and predetermined threshold value $T_1$ ($0<T_1<1$) respectively:

$$U'' = \sum_{i=1}^{N} f_i(a_i, \lambda_i) \cdot v_i$$

-continued $$f_i = \begin{cases} a_i, & (|a_i\lambda_i| \geq \max_j(|a_j\lambda_j|) \cdot T_1) \\ 0, & (|a_i\lambda_i| < \max_j(|a_j\lambda_j|) \cdot T_1) \end{cases}$$

10. A method of manufacturing a sheet according to claim 8, herein if the manipulated variables $(u'_1, u'_2, \ldots, u'_M)^T$ delivered to said consecutive M thickness adjusting means are vector U', the M sheet thickness values $(y'_1, y'_2, \ldots, y'_M)^T$ corresponding to the respective thickness adjusting means are vector Y', and said static process model is represented by Y'=A'U' (A' is a matrix with a size of M×M), then the corrected manipulated variable vector $U'''=(u_1'', U_2'', \ldots, u_M'')$ are derived from the following formula, using the coefficients $a_i$ (i=1, 2, ..., M) of M eigenvectors $v_i$ (i=1, 2, ..., M) of matrix A' obtained by resolving the manipulated variable vector U' before correction by said eigenvectors, the eigenvalues $\lambda_i$ (i=1, 2, ..., M) corresponding to said eigenvectors, and predetermined threshold value $T_2$ ($0<T_2<1$) respectively.

$$U'' = \sum_{i=1}^{N} f_i(a_i, \lambda_i) \cdot v_i$$

$$f_i = \begin{cases} a_i, & (|\lambda_i| \geq \max_j(|\lambda_j|) \cdot T_2) \\ 0, & (|\lambda_i| < \max_j(|\lambda_j|) \cdot T_2) \end{cases}$$

11. A method of manufacturing a sheet according to claim 1, wherein the thickness adjusting means are heating type thickness adjusting means; the control of manipulated variables is to control the heat quantities applied to said heating type thickness adjusting means; and the variations of heat quantities are made larger when the heat quantities are decreased than when the heat quantities are increased.

12. A method of manufacturing a sheet according to claim 1, wherein the thickness distribution of the sheet in the transverse direction is measured; the integral values of the differences between said measured thickness distribution values and the first target preset based on the desired outer diameter profile of the produced roll are obtained; the second target in the respective portions in the transverse direction are corrected based on said integral values; and the manipulated variables applied to said thickness adjusting means are controlled based on the differences between said second target and the measured sheet thickness distribution values using said evaluation function.

13. A device for controlling sheet thickness, which delivers manipulated variables obtained based on the measured sheet thickness values at respective portions of a sheet in the transverse direction measured by a thickness gauge to sheet thickness adjusting means at corresponding positions; comprising a manipulated variable time series deriving means for deriving manipulated variable time series in which a predetermined evaluation function for evaluating the future sheet thickness changes predicted based on said measured values and on a process model expressing the relation between said manipulated variables and sheet thickness values becomes a minimum value and a manipulated variable delivering means for delivering at least the first manipulated variables of the derived manipulated variable time series to said thickness adjusting means.

14. A device for controlling sheet thickness according to claim 13, wherein said manipulated variable time series deriving means uses different evaluation functions in the beginning of production and during stable production, as said predetermined evaluation function, to ensure that the contribution of sheet thickness changes become higher relatively to the contribution of manipulated variables in the beginning of production than during stable production.

15. A device for controlling sheet thickness according to claim 13, wherein said process model used is expressed by a product obtained by multiplying a transfer function and a constant matrix in which at least the diagonal component is not zero.

16. A device for controlling sheet thickness according to claim 13, wherein said manipulated variable time series deriving means uses constants different respectively in the portions corresponding to the edge portions and the central portions of the sheet in the transverse direction, as said constant matrix.

17. A device for controlling sheet thickness according to claim 13, wherein the number of the thickness adjusting means is N (N: a natural number of 2 or more); and provided are a manipulated variable computing means for computing the manipulated variables applied to the respective adjusting means, and a manipulated variable correcting means for correcting the manipulated variable delivered to the i-th (i=1, 2, ..., N) thickness adjusting means, to lessen the differences between the computed manipulated variable of the i-th thickness adjusting means and the manipulated variables delivered to the thickness adjusting means near the i-th thickness adjusting means in the case where the said differences are not less than a predetermined value, T, while correcting the manipulated variables delivered to said near thickness adjusting means based on a static process model expressing the relation between the manipulated variables to be delivered and the sheet thickness values at the position corresponding to the respective thickness adjusting means, to be obtained by them after lapse of a sufficient time.

18. A device for controlling sheet thickness according to claim 13, wherein the number of the thickness adjusting means is N (N: a natural number of 2 or more); and provided is a manipulated variable correcting means for correcting the manipulated variables delivered to consecutive M (M: a natural number of 2 to N) thickness adjusting means based on a static process model expressing the relation between the manipulated variables to be delivered and the sheet thickness values at the position corresponding to the respective thickness adjusting means, to be obtained by them after lapse of a sufficient time, to lessen the dispersion of the manipulated variables delivered to the said consecutive M thickness adjusting means among the manipulated variables of N thickness adjusting means.

19. A device for controlling sheet thickness according to claim 13, wherein provided are an integrating means for obtaining the integral values of the differences between the measured thickness values of the respective portions of the sheet in the transverse direction and the first target preset based on a desired outer diameter profile of the produced roll, a second target correcting means for correcting the second target at the respective portions in the transverse direction based on the values obtained by the integrating means, and a manipulated variable computing means for computing the manipulated variables to be applied to the thickness adjusting means based on the differences between the values obtained by the second desired value correcting means and the measured sheet thickness values.

20. A program, for letting a computer perform the action of repeating, at predetermined intervals, a step of entering the measured thickness values at the respective portions of a sheet in the transverse direction, a step of computing the differences between the target thickness values and the measured thickness values at the respective portions, and a step of computing the manipulated variables to be applied to thickness adjusting means based on the said differences at the respective portions, characterized in that the step of computing manipulated variables includes a step of deriving manipulated variable time series in which a predetermined evaluation function for evaluating the future sheet thickness changes predicted on said measured values and on a process model expressing the relation between said manipulated variables and sheet thickness values becomes a minimum value, and a step of delivering at least the first manipulated variables of the derived manipulated variable time series to said thickness adjusting means.

21. A program according to claim 20, wherein when the future sheet thickness changes obtained based on said measured sheet thickness values and on a process model expressing the relation between said manipulated variables and the sheet thickness values are evaluated using a predetermined evaluation function, used is a process model in which the relation between the manipulated variables of the thickness adjusting means and the sheet thickness values in the edge portions in the transverse direction of the sheet is different from the corresponding relation in the central portion.

22. A program according to claim 20, wherein the number of thickness adjusting means is N (N: a natural number of 2 or more); and the step of computing manipulated variables includes a step of correcting the manipulated variable to be delivered to the i-th (i=1, 2, . . . , N) thickness adjusting means, to lessen the differences between the computed manipulated variable of the i-th thickness adjusting means and the manipulated variables to be delivered to the near thickness adjusting means in the case where the said differences are not less than a predetermined value, T, while correcting the manipulated variables to be delivered to said near thickness adjusting means based on a static process model expressing the relation between the manipulated variables to be delivered and the sheet thickness values at the position corresponding to the respective thickness adjusting means, to be obtained by them after lapse of a sufficient time, and delivering the corrected respective manipulated variables to the respective thickness adjusting means.

23. A program according to claim 20, wherein the number of thickness adjusting means is N (N: a natural number of 2 or more); and the step of computing manipulated variables includes a step of correcting manipulated variables based on a static process model expressing the relation between the manipulated variables to be delivered and the sheet thickness values at the position corresponding to the respective thickness adjusting means, to be obtained by them after lapse of a sufficient time, to lessen the dispersion of the manipulated variables delivered to consecutive M (M: a natural number of 2 or more) thickness adjusting means among the computed manipulated variables, and delivering the corrected respective manipulated variables to the respective thickness adjusting means.

24. A program according to claim 20, wherein the step of computing manipulated variables includes a step of deriving the integral values of the differences between the measured thickness distribution values and the first target preset based on the desired outer diameter profile of the produced roll, a step of correcting the second target at the respective measuring positions based on the said integral values, a step of computing the differences between the target thickness values and said measured values at the respective portions, and a step of computing the manipulated variables applied to the sheet thickness adjusting means based on the differences between the second target values and the measured sheet thickness values.

25. A program according to claim 20, wherein the thickness adjusting means are heating type thickness adjusting means; the control of manipulated variables controls the heat quantities applied to the heating type thickness adjusting means; and the step of computing manipulated variables computes the heat quantities to ensure that the heat quantity variations become larger when the heat quantities are decreased than when they are increased.

26. A storage medium capable of being read by a computer, that stores the program as set forth in claim 20.

27. A sheet obtained by extruding and molding a raw material using a die with plural thickness adjusting means, characterized in that the power spectrum of the thickness profile of the sheet in the transverse direction expressed by the following formula $$P = F(\omega)(F(\omega))^*$$
$$F(\omega) = \int_{-\infty}^{\infty} f(x)e^{-j\omega x}dx$$

(where f(x) is the thickness profile of the sheet in the transverse direction (in $\mu$m), F($\omega$) is the Fourier transform of f(x), x is a position in the transverse direction of the sheet (in m), $\omega$ is a wave number (in m$^{-1}$), and F($\omega$)* is the conjugate complex number of F($\omega$); and j is an imaginary number, and $j^2=-1$) and the mean sheet thickness T ($\mu$m) satisfy the following relation: The mean value X1 of the powers of smaller than a predetermined wave number a is $0.2 \times T^2$ or less and is smaller than the mean value X2 of the powers of wave number a and larger.

28. A sheet according to claim 27, wherein in the power spectrum of the thickness profile of the sheet in the transverse direction, the mean value X1 of the powers of smaller than a predetermined wave number a is smaller than the mean value X2 of the powers of wave number a to 100 m$^{-1}$.

29. A sheet according to claim 27, that satisfies $X1 \leq 0.5 \times X2$.

30. A sheet according to claim 27, wherein the wave number a is 3 m$^{-1}$ to 30 m$^{-1}$.

31. A sheet according to claim 27, wherein the wave number a is equal to 1/(an interval between thickness adjusting means×stretching ratio of the sheet in the transverse direction).

32. A sheet according to claim 27, that satisfies $0.5 \times (1/\text{wave number a}) \leq (\text{amplitude of oscillation}) \leq 5 \times (1/\text{wave number a})$.

33. A sheet according to claim 27, which is a plastic film.

* * * * *